United States Patent
Chen et al.

(10) Patent No.: US 11,917,624 B2
(45) Date of Patent: Feb. 27, 2024

(54) TECHNIQUES FOR MULTIPLEXING UPLINK CONTROL INFORMATION ON UPLINK CHANNEL REPETITIONS

(71) Applicant: QUALCOMM Incorporated, San Diego, CA (US)

(72) Inventors: Yitao Chen, San Diego, CA (US); Mostafa Khoshnevisan, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/390,696

(22) Filed: Jul. 30, 2021

(65) Prior Publication Data

US 2023/0035886 A1 Feb. 2, 2023

(51) Int. Cl.
*H04W 72/21* (2023.01)
*H04L 1/08* (2006.01)
*H04L 5/00* (2006.01)

(52) U.S. Cl.
CPC .............. *H04W 72/21* (2023.01); *H04L 1/08* (2013.01); *H04L 5/0057* (2013.01)

(58) Field of Classification Search
CPC ......... H04W 72/21; H04L 1/08; H04L 5/0057
USPC ......................................................... 370/329
See application file for complete search history.

(56) References Cited

U.S. PATENT DOCUMENTS

| 2012/0140649 | A1* | 6/2012 | Choudhury | ........... | H04L 5/0053 370/252 |
| 2020/0120656 | A1* | 4/2020 | Zhou | .................... | H04B 7/0695 |

FOREIGN PATENT DOCUMENTS

| WO | WO-2022084975 A1 | 4/2022 |
| WO | WO-2022216452 A1 | 10/2022 |

OTHER PUBLICATIONS

Huawei, et al., "Enhancements on Multi-TRP for Reliability and Robustness in Rel-17", 3GPP TSG RAN WG1 #105-e, R1-2104267, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 8 Pages, XP052010721, Sections 1-5.

(Continued)

*Primary Examiner* — Chi Tang P Cheng
(74) *Attorney, Agent, or Firm* — Holland & Hart LLP

(57) ABSTRACT

Methods, systems, and devices for wireless communications are described. In some aspects, a user equipment (UE) may receive control signaling scheduling transmission of aperiodic channel state information (A-CSI) via a set of uplink transmission repetitions, the set of uplink transmission repetitions including a first set of repetitions associated with a first sounding reference signal (SRS) resource set and a second set of repetitions associated with a second SRS resource set. The UE may receive additional control signaling scheduling transmission of an uplink control channel message that overlaps in time with at least one uplink transmission repetition of the set of uplink transmission repetitions. The UE may multiplex the uplink control channel message with at least one uplink transmission repetition of the set of uplink transmission repetitions, and may transmit the set of uplink transmission repetitions including multiple repetitions of the A-CSI and the multiplexed uplink control channel message.

20 Claims, 18 Drawing Sheets

(56) References Cited

OTHER PUBLICATIONS

International Search Report and Written Opinion—PCT/US2022/074154—ISA/EPO—dated Nov. 25, 2022.
Qualcomm Incorporated: "Enhancements on Multi-TRP for PDCCH, PUCCH and PUSCH", 3GPP TSG-RAN WG1 Meeting #105-bis-e, R1-2104655, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, pp. 1-17, XP052010906, Sections 1-5.
TCL Communication: "Enhancements on Multi-TRP for PUCCH and PUSCH", 3GPP TSG RAN WG1 Meeting #105-e, R1-2105837, 3rd Generation Partnership Project, Mobile Competence Centre, 650, Route Des Lucioles, F-06921 Sophia-Antipolis Cedex, France, vol. RAN WG1, No. E-meeting, May 10, 2021-May 27, 2021, May 12, 2021, 8 Pages, XP052011747, Sections 1-4.

* cited by examiner

TECHNIQUES FOR MULTIPLEXING UPLINK CONTROL INFORMATION ON UPLINK CHANNEL REPETITIONS

FIELD OF TECHNOLOGY

The following relates to wireless communications, including techniques for multiplexing uplink control information (UCI) on uplink channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to multiplex a scheduled uplink control message (e.g., a physical uplink control channel (PUCCH) message that includes uplink control information (UCI)) with an uplink data message (e.g., a physical uplink shared channel (PUSCH) message) when the scheduled PUCCH message overlaps with the PUSCH message in the time domain. Further, in some cases, a UE may be configured to transmit multiple repetitions of PUSCH transmissions using multiple uplink beams, such as in cases with multiple transmission-reception points (mTRPs). However, in such cases with multiple sets of PUSCH transmissions which are scheduled to carry A-CSI, conventional solutions do not specify if or how, or if, other PUCCH messages may be multiplexed within the PUSCH transmissions.

SUMMARY

The described techniques relate to improved methods, systems, devices, and apparatuses that support techniques for multiplexing uplink control information (UCI) on uplink channel repetitions. Generally, aspects of the present disclosure provide a set of rules or configurations for determining how an uplink control message (e.g., physical uplink control channel (PUCCH) carrying uplink control information (UCI)) which overlaps with a set of physical uplink shared channel (PUSCH) repetitions associated with multiple beams (e.g., mTRP PUSCH repetitions) may be multiplexed with the PUSCH repetitions. In particular, aspects of the present disclosure provide different UCI multiplexing configurations for multiplexing PUCCH messages with mTRP PUSCH repetitions. Each of the UCI multiplexing configurations may define a set of rules for identifying which PUSCH repetitions an overlapping PUCCH message may be multiplexed with. Moreover, aspects of the present disclosure are directed to a set of conditions which must be satisfied for multiplexing PUCCH messages with mTRP PUSCH repetitions, including conditions based on a length of the PUSCH repetitions, relative arrangements of the overlapping PUCCH messages relative to the PUSCH repetitions, and information to be carried by each PUSCH repetition (e.g., A-CSI, other control information).

A method for wireless communication at a user equipment (UE) is described. The method may include receiving, from a base station, control signaling scheduling transmission of aperiodic channel state information (A-CSI) via a set of multiple uplink transmission repetitions, the set of multiple uplink transmission repetitions including a first set of repetitions associated with a first sounding reference signal (SRS) resource set and a second set of repetitions associated with a second SRS resource set, receiving, from the base station, additional control signaling scheduling transmission of an uplink control channel message that overlaps in time with at least one uplink transmission repetition of the set of multiple uplink transmission repetitions, multiplexing the uplink control channel message with at least one uplink transmission repetition of the set of multiple uplink transmission repetitions, and transmitting the set of multiple uplink transmission repetitions including a set of multiple repetitions of the A-CSI and the multiplexed uplink control channel message.

An apparatus for wireless communication at a UE is described. The apparatus may include at least one processor, memory coupled to the at least one processor, and instructions stored in the memory. The instructions may be executable by the at least one processor to cause the apparatus to receive, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set, receive, from the base station, additional control signaling scheduling transmission of an uplink control channel message that overlaps in time with at least one uplink transmission repetition of the set of multiple uplink transmission repetitions, multiplex the uplink control channel message with at least one uplink transmission repetition of the set of multiple uplink transmission repetitions, and transmit the set of multiple uplink transmission repetitions including a set of multiple repetitions of the A-CSI and the multiplexed uplink control channel message.

Another apparatus for wireless communication at a UE is described. The apparatus may include means for receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set, means for receiving, from the base station, additional control signaling scheduling transmission of an uplink control channel message that overlaps in time with at least one uplink transmission repetition of the set of multiple uplink transmission repetitions, means for multiplexing the uplink control channel message with at least one uplink transmission repetition of the set of multiple uplink transmission repetitions, and means for transmitting the set of multiple uplink transmission repetitions including a set of multiple repetitions of the A-CSI and the multiplexed uplink control channel message.

A non-transitory computer-readable medium storing code for wireless communication at a UE is described. The code may include instructions executable by at least one processor to receive, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set, receive, from the base station, additional control signaling scheduling transmission of an uplink control channel message that overlaps in time with at least one uplink transmission repetition of the set of multiple uplink transmission repetitions, multiplex the uplink control channel message with at least one uplink transmission repetition of the set of multiple uplink transmission repetitions, and transmit the set of multiple uplink transmission repetitions including a set of multiple repetitions of the A-CSI and the multiplexed uplink control channel message.

In some examples of the method, apparatuses, and non-transitory computer-readable medium described herein, multiplexing the uplink control channel message may include operations, features, means, or instructions for multiplexing a first repetition of the uplink control channel message via a first uplink channel repetition of the first set of repetitions which follows in time the scheduled uplink control channel message and multiplexing a second repetition of the uplink control channel message via a first uplink channel repetition of the second set of repetitions which follows in time the scheduled uplink control channel message.

Some examples of the method, apparatuses, and non-transitory computer-readable medium described herein may further include operations, features, means, or instructions for multiplexing the first repetition and the second repetition based on a first length of the first uplink channel repetition of the first set of repetitions being equal to a second length of the first uplink channel repetition of the second set of repetitions.

Some examples of the method, apparatuses, and non-transitory computer-readable medium described herein may further include operations, features, means, or instructions for multiplexing the first repetition and the second repetition based on an absence of additional uplink control channel messages multiplexed with the first uplink channel repetition of the first set of repetitions and the first uplink channel repetition of the second set of repetitions.

Some examples of the method, apparatuses, and non-transitory computer-readable medium described herein may further include operations, features, means, or instructions for multiplexing the first repetition and the second repetition based on an additional uplink control channel message being multiplexed with both the first uplink channel repetition of the first set of repetitions and the first uplink channel repetition of the second set of repetitions.

Some examples of the method, apparatuses, and non-transitory computer-readable medium described herein may further include operations, features, means, or instructions for transmitting a first repetition of the A-CSI via the first uplink channel repetition of the first set of repetitions which follows in time the scheduled uplink control channel message and transmitting a second repetition of the A-CSI via the first uplink channel repetition of the second set of repetitions which follows in time the scheduled uplink control channel message.

In some examples of the method, apparatuses, and non-transitory computer-readable medium described herein, multiplexing the uplink control channel message may include operations, features, means, or instructions for multiplexing a first repetition of the uplink control channel message via a first uplink channel repetition of the first set of repetitions which follows in time the scheduled uplink control channel message and which does not include a repetition of the A-CSI or other multiplexed uplink control channel messages.

In some examples of the method, apparatuses, and non-transitory computer-readable medium described herein, multiplexing the uplink control channel message may include operations, features, means, or instructions for multiplexing a second repetition of the uplink control channel messages via a first uplink channel repetition of the second set of repetitions which follows in time the scheduled uplink control channel message and which does not include a repetition of the A-CSI or other multiplexed uplink control channel messages.

In some examples of the method, apparatuses, and non-transitory computer-readable medium described herein, multiplexing the uplink control channel message may include operations, features, means, or instructions for identifying a quantity of uplink transmission repetitions of the set of multiple uplink transmission repetitions which overlap in time with the uplink control channel repetition, where multiplexing the uplink control channel message may be based on the quantity of uplink transmission repetitions.

In some examples of the method, apparatuses, and non-transitory computer-readable medium described herein, multiplexing the uplink control channel message may include operations, features, means, or instructions for identifying a UCI multiplexing configuration from a set of multiple UCI multiplexing configurations supported by the UE based on the quantity of uplink transmission repetitions of the set of multiple uplink transmission repetitions which overlap in time with the uplink control channel repetition, the UCI multiplexing configuration governing multiplexing of the uplink control channel message with the at least one uplink transmission repetition of the set of multiple uplink transmission repetitions.

In some examples of the method, apparatuses, and non-transitory computer-readable medium described herein, transmitting the set of multiple uplink channel repetitions including the set of multiple repetitions of the A-CSI may include operations, features, means, or instructions for transmitting a first repetition of the A-CSI via a first uplink channel repetition of the first set of repetitions and a second repetition of the A-CSI via a first uplink channel repetition of the second set of repetitions.

In some examples of the method, apparatuses, and non-transitory computer-readable medium described herein, the uplink control channel message includes a UCI message.

In some examples of the method, apparatuses, and non-transitory computer-readable medium described herein, the uplink control channel message includes hybrid automatic repeat request (HARQ) information, periodic channel state information (P-CSI), semi-persistent channel state information (SP-CSI), or any combination thereof.

In some examples of the method, apparatuses, and non-transitory computer-readable medium described herein, the set of multiple uplink transmission repetitions and the uplink control channel message may be scheduled on the same uplink component carrier.

In some examples of the method, apparatuses, and non-transitory computer-readable medium described herein, the set of multiple uplink transmission repetitions may be scheduled on a first uplink component carrier, and the uplink control channel message may be scheduled on a second uplink component carrier which may be different from the first uplink component carrier.

A method for wireless communication at a base station is described. The method may include transmitting, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set, transmitting, to the UE, additional control signaling scheduling transmission of an uplink control channel message that overlaps in time with at least one uplink transmission repetition of the set of multiple uplink transmission repetitions, and receiving the set of multiple uplink transmission repetitions including a set of multiple repetitions of the A-CSI and the uplink control channel message multiplexed with at least one uplink transmission repetition of the set of multiple uplink transmission repetitions.

An apparatus for wireless communication at a base station is described. The apparatus may include at least one processor, memory coupled to the at least one processor, and instructions stored in the memory. The instructions may be executable by the at least one processor to cause the apparatus to transmit, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set, transmit, to the UE, additional control signaling scheduling transmission of an uplink control channel message that overlaps in time with at least one uplink transmission repetition of the set of multiple uplink transmission repetitions, and receive the set of multiple uplink transmission repetitions including a set of multiple repetitions of the A-CSI and the uplink control channel message multiplexed with at least one uplink transmission repetition of the set of multiple uplink transmission repetitions.

Another apparatus for wireless communication at a base station is described. The apparatus may include means for transmitting, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set, means for transmitting, to the UE, additional control signaling scheduling transmission of an uplink control channel message that overlaps in time with at least one uplink transmission repetition of the set of multiple uplink transmission repetitions, and means for receiving the set of multiple uplink transmission repetitions including a set of multiple repetitions of the A-CSI and the uplink control channel message multiplexed with at least one uplink transmission repetition of the set of multiple uplink transmission repetitions.

A non-transitory computer-readable medium storing code for wireless communication at a base station is described. The code may include instructions executable by at least one processor to transmit, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set, transmit, to the UE, additional control signaling scheduling transmission of an uplink control channel message that overlaps in time with at least one uplink transmission repetition of the set of multiple uplink transmission repetitions, and receive the set of multiple uplink transmission repetitions including a set of multiple repetitions of the A-CSI and the uplink control channel message multiplexed with at least one uplink transmission repetition of the set of multiple uplink transmission repetitions.

In some examples of the method, apparatuses, and non-transitory computer-readable medium described herein, receiving the set of multiple uplink transmission repetitions may include operations, features, means, or instructions for receiving a first repetition of the uplink control channel message multiplexed with a first uplink channel repetition of the first set of repetitions which follows in time the scheduled uplink control channel message and receiving a second repetition of the uplink control channel message multiplexed with a first uplink channel repetition of the second set of repetitions which follows in time the scheduled uplink control channel message.

In some examples of the method, apparatuses, and non-transitory computer-readable medium described herein, the first repetition and the second repetition may be multiplexed based on a first length of the first uplink channel repetition of the first set of repetitions being equal to a second length of the first uplink channel repetition of the second set of repetitions.

In some examples of the method, apparatuses, and non-transitory computer-readable medium described herein, the first repetition and the second repetition may be multiplexed based on an absence of additional uplink control channel messages multiplexed with the first uplink channel repetition of the first set of repetitions and the first uplink channel repetition of the second set of repetitions.

In some examples of the method, apparatuses, and non-transitory computer-readable medium described herein, the first repetition and the second repetition may be multiplexed based on an additional uplink control channel message being multiplexed with both the first uplink channel repetition of the first set of repetitions and the first uplink channel repetition of the second set of repetitions.

Some examples of the method, apparatuses, and non-transitory computer-readable medium described herein may further include operations, features, means, or instructions for receiving a first repetition of the A-CSI via the first uplink channel repetition of the first set of repetitions which follows in time the scheduled uplink control channel message and receiving a second repetition of the A-CSI via the first uplink channel repetition of the second set of repetitions which follows in time the scheduled uplink control channel message.

In some examples of the method, apparatuses, and non-transitory computer-readable medium described herein, receiving the set of multiple uplink transmission repetitions may include operations, features, means, or instructions for receiving a first repetition of the uplink control channel message multiplexed with a first uplink channel repetition of the first set of repetitions which follows in time the scheduled uplink control channel message and which does not include a repetition of the A-CSI or other multiplexed uplink control channel messages.

In some examples of the method, apparatuses, and non-transitory computer-readable medium described herein, receiving the set of multiple uplink transmission repetitions may include operations, features, means, or instructions for receiving a second repetition of the uplink control channel message multiplexed with a first uplink channel repetition of the second set of repetitions which follows in time the scheduled uplink control channel message and which does not include a repetition of the A-CSI or other multiplexed uplink control channel messages.

In some examples of the method, apparatuses, and non-transitory computer-readable medium described herein, the uplink control channel message may be multiplexed with the at least one uplink transmission repetition of the set of multiple uplink transmission repetitions in accordance with a UCI multiplexing configuration supported by the UE based on a quantity of uplink transmission repetitions of the set of multiple uplink transmission repetitions which overlap in time with the uplink control channel repetition.

In some examples of the method, apparatuses, and non-transitory computer-readable medium described herein, receiving the set of multiple uplink channel repetitions including the set of multiple repetitions of the A-CSI may include operations, features, means, or instructions for receiving a first repetition of the A-CSI via a first uplink channel repetition of the first set of repetitions and a second repetition of the A-CSI via a first uplink channel repetition of the second set of repetitions.

In some examples of the method, apparatuses, and non-transitory computer-readable medium described herein, the uplink control channel message includes a UCI message.

In some examples of the method, apparatuses, and non-transitory computer-readable medium described herein, the uplink control channel message includes HARQ information, P-CSI, SP-CSI, or any combination thereof.

In some examples of the method, apparatuses, and non-transitory computer-readable medium described herein, the set of multiple uplink transmission repetitions and the uplink control channel message may be scheduled on the same uplink component carrier.

In some examples of the method, apparatuses, and non-transitory computer-readable medium described herein, the set of multiple uplink transmission repetitions may be scheduled on a first uplink component carrier, and the uplink control channel message may be scheduled on a second uplink component carrier which may be different from the first uplink component carrier.

DETAILED DESCRIPTION

In some wireless communications systems, a user equipment (UE) may be configured to multiplex a scheduled uplink control message (e.g., a physical uplink control channel (PUCCH) message that includes uplink control information (UCI)) with an uplink data message (e.g., a physical uplink shared channel (PUSCH) message) when the scheduled PUCCH message overlaps with the PUSCH message in the time domain. Some wireless communications systems have implemented certain restrictions for multiplexing PUCCH messages with PUSCH messages in cases where the PUSCH messages are scheduled to include aperiodic channel state information (A-CSI).

Further, in some cases, a UE may be configured to transmit multiple repetitions of PUSCH transmissions using multiple uplink beams, such as in cases with multiple transmission-reception points (mTRPs). For example, a UE may be configured to transmit multiple repetitions of a PUSCH transmission using a first beam, and multiple repetitions of the PUSCH transmission using a second beam. In such cases with multiple sets of PUSCH transmissions which are scheduled to carry A-CSI, conventional solutions do not specify if or how other PUCCH messages may be multiplexed within the PUSCH transmissions. That is, in cases where a PUCCH message overlaps with a set of linked PUSCH transmissions including sets of PUSCH transmissions associated with different beams, conventional solutions do not specify if or how the UE may multiplex the PUCCH message within the PUSCH transmissions.

Accordingly, aspects of the present disclosure provide a set of rules or configurations for determining how a PUCCH message (e.g., UCI) which overlaps with a set of linked PUSCH repetitions associated with multiple beams (e.g., mTRP PUSCH repetitions) may be multiplexed with the PUSCH repetitions. In particular, aspects of the present disclosure provide different UCI multiplexing configurations for multiplexing PUCCH messages with mTRP PUSCH repetitions scheduled to carry A-CSI. Each of the UCI multiplexing configurations may define a set of rules for identifying which PUSCH repetitions an overlapping PUCCH message may be multiplexed with. Moreover, aspects of the present disclosure are directed to a set of conditions which must be satisfied for multiplexing PUCCH messages with mTRP PUSCH repetitions, including conditions based on a length of the PUSCH repetitions, and information to be carried by each PUSCH repetition (e.g., A-CSI, other control information).

Aspects of the disclosure are initially described in the context of wireless communications systems. Additional aspects of the disclosure are described in the context of example resource configurations and an example process flow. Aspects of the disclosure are further illustrated by and described with reference to apparatus diagrams, system diagrams, and flowcharts that relate to techniques for multiplexing UCI on uplink channel repetitions.

Figure 1:
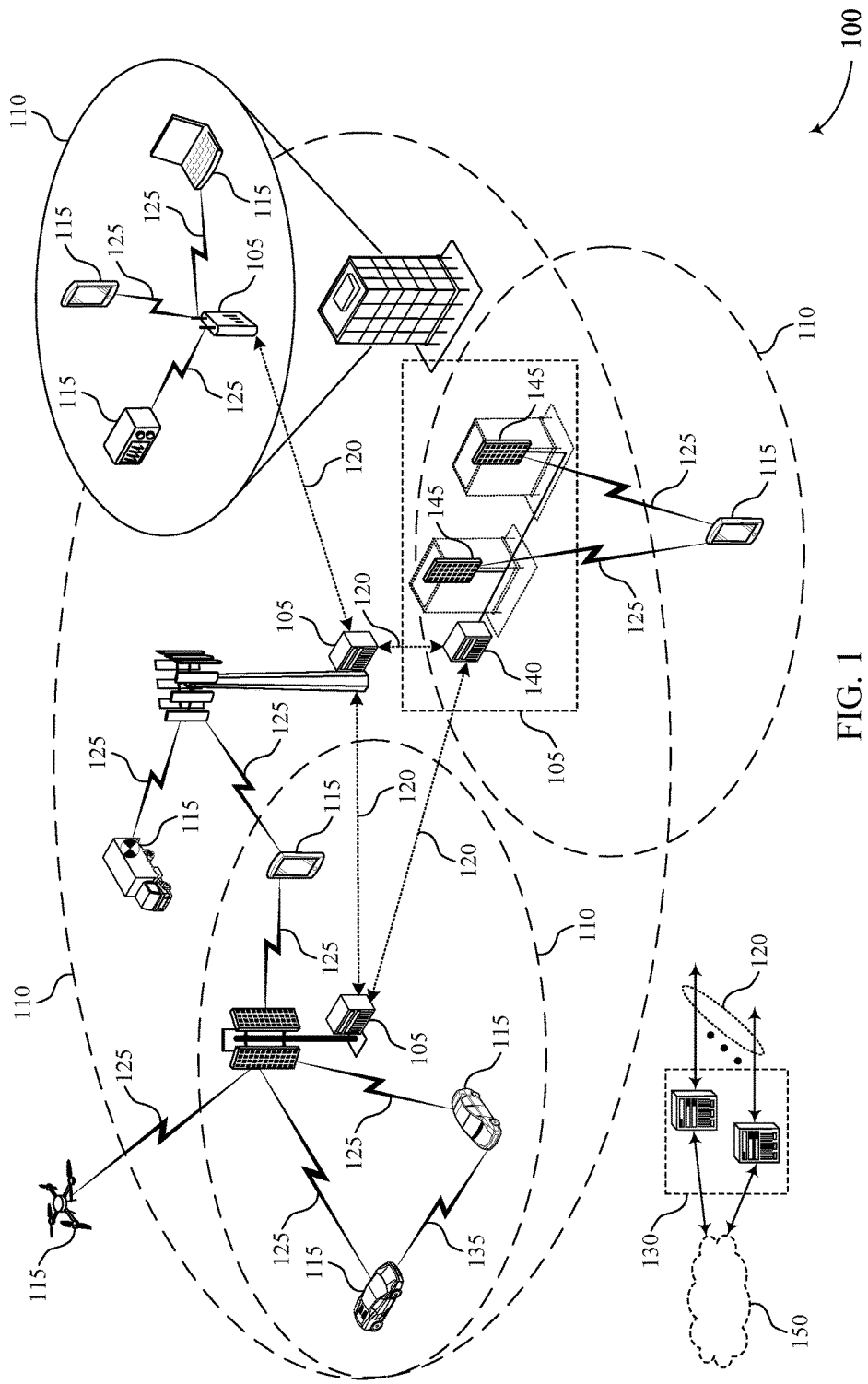
FIG. 1 illustrates an example of a wireless communications system that supports techniques for multiplexing uplink control information (UCI) on uplink channel repetitions in accordance with aspects of the present disclosure.

FIG. 1 illustrates an example of a wireless communications system 100 that supports techniques for multiplexing UCI on uplink channel repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for multiplexing UCI messages with linked PUSCH repetitions. The UEs 115 and the base stations 105 of the wireless communications system 100 may be configured to support a set of UCI multiplexing configurations for determining how a PUCCH message (e.g., UCI) which overlaps with a set of linked PUSCH repetitions associated with multiple beams (e.g., mTRP PUSCH repetitions) may be multiplexed with the PUSCH repetitions. In particular, aspects of the present disclosure provide different rules/configurations for multiplexing PUCCH messages with mTRP PUSCH repetitions scheduled to carry A-CSI.

Each of the UCI multiplexing configurations may define a set of rules for identifying which PUSCH repetitions an overlapping PUCCH message may be multiplexed with. Moreover, aspects of the present disclosure are directed to a set of conditions which must be satisfied for multiplexing PUCCH messages with mTRP PUSCH repetitions, including conditions based on a length of the PUSCH repetitions, a relative arrangement of the overlapping PUCCH message relative to the PUSCH repetitions, and information to be carried by each PUSCH repetition (e.g., A-CSI, other control information).

Techniques described herein may enable UCI messages which overlap with one or more linked PUSCH repetitions to be multiplexed on one or more of the linked PUSCH repetitions. As such, techniques provided herein may reduce control signaling overhead within the wireless communications system 100 and may lead to more efficient utilization of resources.

Figure 2:
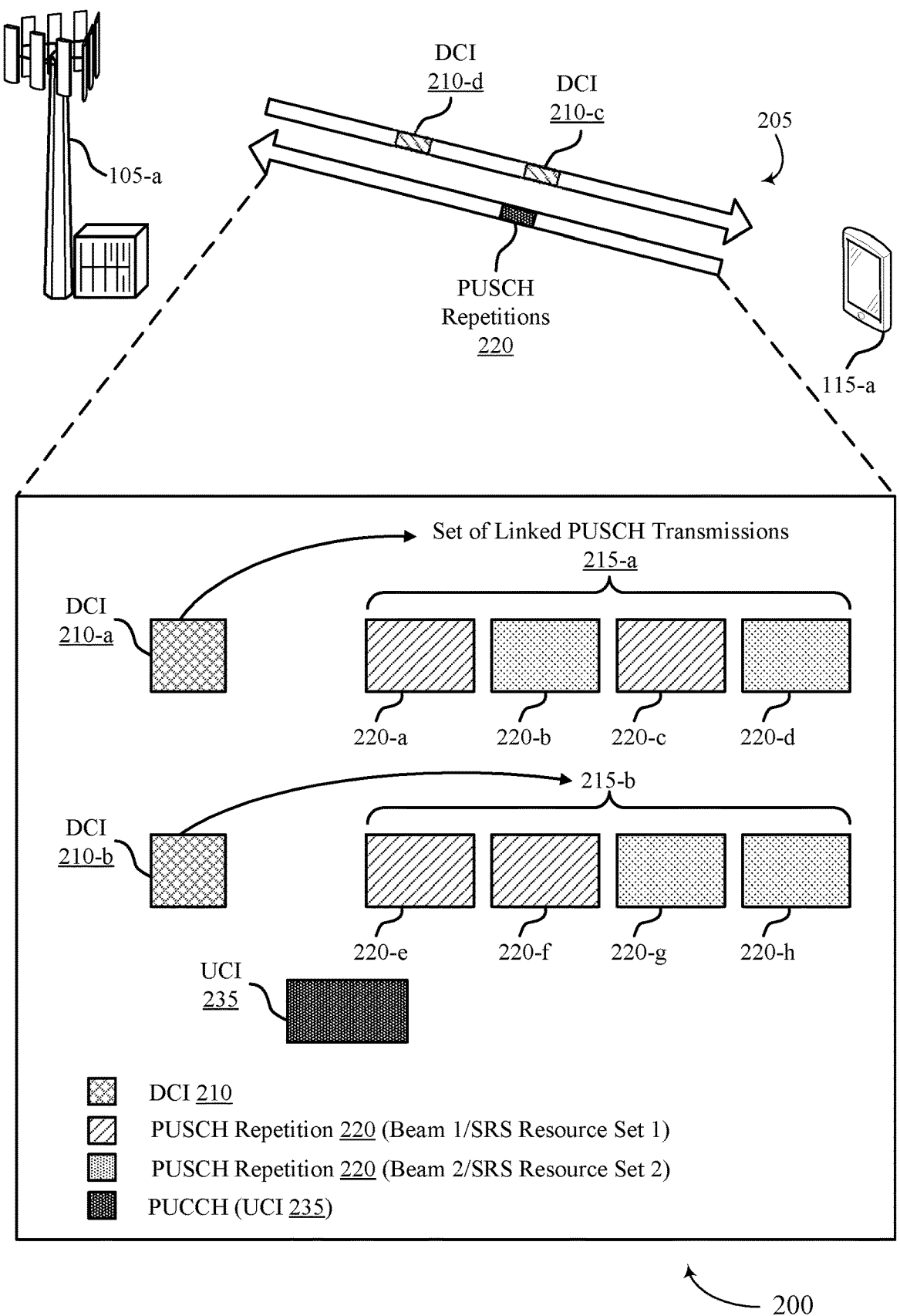
FIG. 2 illustrates an example of a wireless communications system that supports techniques for multiplexing UCI on uplink channel repetitions in accordance with aspects of the present disclosure.

FIG. 2 illustrates an example of a wireless communications system 200 that supports techniques for multiplexing UCI on uplink channel repetitions in accordance with aspects of the present disclosure. In some examples, wireless communications system 200 may implement, or be implemented by, aspects of wireless communications system 100. For example, wireless communications system 200 may support techniques for multiplexing UCI messages with linked PUSCH repetitions, as described in FIG. 1.

The wireless communications system 200 may include a base station 105-a and a UE 115-a, which may be examples base stations 105 and UEs 115 as described with reference to FIG. 1. The UE 115-a may communicate with the base station 105-a using a communication link 205, which may be an example of an NR or LTE link between the UE 115-a and the base station 105-a. In some cases, the communication link 205 between the UE 115-a and the base station 105-a may include an example of an access link (e.g., Uu link) which may include a bi-directional link that enables both uplink and downlink communication. For example, the UE 115-a may transmit uplink signals, such as uplink control signals or uplink data signals (e.g., PUSCH transmissions), to the base station 105-a using the communication link 205 and the base station 105-a may transmit downlink signals, such as downlink control signals or downlink data signals, to the UE 115-a using the communication link 205.

Some wireless communications systems (e.g., wireless communications systems 100, 200) are configured with a set of multiplexing rules which are configured to reduce or eliminate collisions (e.g., time overlap) between different uplink channels. Multiplexing rules may be associated with collisions of different types of uplink communications, such as collisions between PUSCH and PUCCH communications, or between multiple PUCCH communications. For instance, multiplexing rules may be associated with collisions between PUCCH messages for HARQ-ACK scheduling requests (e.g., collision between $PUCCH_{HARQ-ACK}$ and $PUCCH_{SR}$), collisions between PUCCH messages for HARQ-ACK and channel state information (CSI) (e.g., collision between $PUCCH_{HARQ-ACK}$ and $PUCCH_{CSI}$), colli-sions between PUCCH messages for scheduling requests and CSI (e.g., collision between $PUCCH_{SR}$ and $PUCCH_{CSI}$), collisions between PUCCH messages for HARQ-ACK, CSI, and scheduling requests (e.g., collision between $PUCCH_{HARQ-ACK}$, $PUCCH_{CSI}$, and $PUCCH_{SR}$), or any combination thereof. The respective multiplexing rules which are applied may be based on the type of uplink communications (e.g., PUSCH, PUCCH), as well as the type of data communicated within each uplink communication (e.g., HARQ-ACK, scheduling requests, CSI).

For each of the respective collision multiplexing rules supported by the wireless communications system 200, and assuming applicable timelines are satisfied (e.g., scheduling timelines, UE processing timelines), UEs 115 and other wireless devices may be configured to multiplex one or more UCI messages on PUCCH and/or PUSCH messages. The UCI multiplexing behavior may be defined by the various multiplexing rules in order to reduce or eliminate conflicts between uplink communications. For example, when a scheduled UCI message overlaps in the time domain with a PUSCH message, the UCI may be multiplexed with the PUSCH message. In this example, a beta offset which is pre-configured (e.g., via RRC signaling) and/or signaled in an uplink grant (e.g., downlink control information (DCI) message, DCI 0_1) may be used to control rate matching behavior for multiplexing the UCI message with the PUSCH message. In other words, a beta offset may be used by UEs 115 to determine how to multiplex PUCCH messages (e.g., UCI messages) with PUSCH messages, for example, by indicating a number of resources that a UCI payload can occupy on a PUSCH.

There may be a general priority which defines a relative order in which uplink control data is multiplexed with other uplink communications. For example, in some cases, CSI may first be multiplexed on PUCCH (if multiple CSI reports are scheduled in a given slot/transmission time interval (TTI)). Next, HARQ-ACK, scheduling requests, and CSI may be multiplexed on PUCCH when the respective information (e.g., HARQ-ACK, scheduling request, CSI) overlaps with the PUCCH. Finally, UCI may be multiplexed with PUSCH when the UCI overlaps with the PUSCH in the time domain.

There is a motivation to improve a reliability and robustness for PUSCH transmissions in order to improve a reliability of wireless communications. One such technique for improving uplink reliability and robustness is the use of mTRP or multi-panel transmissions. For example, in the context of mTRP transmissions, a UE 115 may be configured to transmit a first set of PUSCH transmissions (e.g., PUSCH repetitions) using a first beam or first sounding reference signal (SRS) resource set, and a second set of PUSCH transmissions (e.g., PUSCH repetitions) using a second beam or second SRS resource set. The use of different transmit beams/SRS resource sets may improve link diversity, and improve a probability that one of the PUSCH repetitions will be successfully received by the network. For instance, if one link is blocked (e.g., if one transmit beam is interrupted), PUSCH transmissions performed using the other uplink beam may still be successfully received using another TRP.

For example, as shown in FIG. 2, the UE 115-a may receive a DCI message 210-a and a DCI message 210-b which schedule sets of linked PUSCH transmissions 215-a and 215-b, respectively. Each of the respective sets of PUSCH transmissions 215-a and 215-b may include PUSCH repetitions 220 which are associated with a first beam and/or first SRS resource set (and/or first set of uplink power control parameters), and PUSCH repetitions 220 which are associated with a second beam and/or second SRS resource set (and/or second set of uplink power control parameters). In some aspects, PUSCH repetitions 220 associated with the first beam/first SRS resource set may be targeted toward a first TRP at the base station 105-*a*, whereas PUSCH repetitions 220 associated with the second beam/ second SRS resource set may be targeted toward a second TRP at the base station 105-*a*.

For instance, the first set of PUSCH transmissions 215-*a* may include a first PUSCH repetition 220-*a* and a third PUSCH repetition 220-*c* which are associated with a first uplink beam (first SRS resource set). Moreover, the first set of PUSCH transmissions 215-*a* may further include a second PUSCH repetition 220-*b* and a fourth PUSCH repetition 220-*d* which are associated with a second uplink beam (second SRS resource set). Similarly, the second set of linked PUSCH transmissions 215-*b* includes first and second PUSCH repetitions 220-*e* and 220-*f* associated with the first uplink beam/first SRS resource set, and third and fourth PUSCH repetitions 220-*g* and 220-*h* associated with the second uplink beam/second SRS resource set. In this regard, the first set of linked PUSCH transmissions 215-*a* may illustrate an example of a cyclical beam mapping pattern, whereas second set of linked PUSCH transmissions 215-*b* may illustrate an example of a sequential beam mapping pattern.

Some wireless communications systems may support multiple types of PUSCH repetitions, including Type A and Type B, which may be based on a relative timing of the respective PUSCH transmissions. The sets of linked PUSCH transmissions 215 illustrated in FIG. 2 may be configured as PUSCH repetition Type A or Type B. In PUSCH repetition Type A, different PUSCH transmission occasions (e.g., PUSCH repetitions 220) corresponding to the same transport block may be transmitted in different slots. Additionally, with PUSCH repetition Type A, PUSCH repetitions 220 in different slots/TTIs may occupy the same symbols (e.g., same starting symbol, same length of symbols) within each respective slot/TTI.

In some aspects, the number of PUSCH repetitions (K) (e.g., the quantity of PUSCH repetitions 220 within the sets of linked PUSCH transmissions 215) may be RRC configured, or may be dynamically indicated via time domain resource allocation (TDRA) fields of the respective DCI messages 210-*a*, 210-*b*. In the context of RRC configuration, and in cases where the UE 115-*a* is configured with pusch-AggregationFactor, the number of repetitions K of PUSCH repetitions 220 is equal to pusch-AggregationFactor. Comparatively, in the context of dynamic indication, if the number of repetitions K is present in the TDRA table (e.g., "numberofrepetitions" field) the number of repetitions K is equal to the "numberofrepetitions" field indicated by the DCI message 210 (e.g., pointing to a TDRA row).

Comparatively, in PUSCH repetition Type B, different PUSCH transmission occasions (e.g., PUSCH repetitions) corresponding to the same transport block may be transmitted in mini-slots (e.g., multiple PUSCH repetitions may be transmitted within the same slot). In PUSCH repetition Type B, a number of "nominal" PUSCH repetitions 220 may be indicated via the scheduling DCI message 210, where the number of nominal PUSCH repetitions 220 are consecutive (e.g., end of one PUSCH repetition 220 marks the beginning of a subsequent PUSCH repetition 220) and have the same length. In some cases, a nominal repetition may cross a slot boundary, in which case it is divided up into two actual PUSCH repetitions 220. When some of the symbols of a nominal repetition are identified as invalid symbols, a nominal repetition is divided into multiple actual repetitions after removing the invalid symbols. Invalid symbols can be due to semi-static downlink symbols, an indicated symbol in a pattern of invalid symbols, synchronization signal block (SSB) symbols, or symbols where a control resource set (CORESET) is monitored (e.g., CORESET0 for Type0-PDCCH is monitored).

In some aspects, each of the respective PUSCH repetitions 220 corresponding to the respective SRS resource sets are transmitted using the same beam (e.g., first uplink beam, second uplink beam). In other words, the SRS resource indicator (SRI) field of the DCI message 210-*a*, 210-*b* is applied to each of the PUSCH repetitions 220 corresponding to the respective uplink beams within the set of linked PUSCH transmissions 215-*a* and 215-*b*, respectively. In some aspects, the SRI is a field in the DCI which determines the beam and uplink power control parameters for PUSCH transmissions by pointing to one or more SRS resources within an SRS resource set.

When different PUSCH repetitions 220 are intended to be received at different TRPs, different panels, and/or different antennas at a base station 105, it may not be preferable to transmit all the PUSCH repetitions 220 using the same beam. For example, as noted previously herein, one of the uplink beams may be blocked, or otherwise experience interference. As such, a reliability of the PUSCH repetitions 220 may be improved by transmitting different PUSCH repetitions 220 using different beams, as shown in FIG. 2. In particular, scheduled PUSCH repetitions 220 may belong to two or more sets, where each set is associated with its own uplink beam and power control parameters.

For example, as shown in FIG. 2, PUSCH repetitions 220 of the first set of linked PUSCH transmissions 215-*a* may correspond to two SRS resource sets, where the DCI message 210-*a* indicates two different uplink beams and two sets of power control params (e.g., $P_O$, $\alpha$, PL RS, closed loop index) by two corresponding SRI fields within the respective DCI message 210-*a*. In other words, the DCI message 210-*a* may include a first SRI field for the PUSCH repetitions 220-*a* and 220-*c* corresponding to the first uplink beam and first set of power control parameters, and a second SRI feed for the PUSCH repetitions 220-*b* and 220-*d* corresponding to the second uplink beam and second set of power control parameters.

Moreover, in some cases, a network may be able to dynamically switch between single TRP (sTRP) communications and mTRP communications. In particular, a field within the DCI message 210 may be used to dynamically switch between sTRP and mTRP. The field for sTRP/mTRP switching may include two bits which indicate which/how many sets of parameters are to be used for the scheduled PUSCH transmissions. For example, a field in the DCI message 210-*a* may indicate for the UE 115-*a* to transmit scheduled PUSCH transmissions according to one of the following: (1) use only a first set of parameters corresponding to a first TRP (TRP1) for sTRP communications; (2) use only a second set of parameters corresponding to a second TRP (TRP2) for sTRP communications; (3) use both sets of parameters for two sets of repetitions with a first order (TRP1, TRP2) for mTRP communications; or (4) use both sets of parameters for two sets of repetitions with a second order (TRP2, TRP1) mapped to codepoints. The four different options for indicating sTRP/mTRP communications may be mapped to the bit field values {00, 01, 10, and 11} within the respective DCI messages 210-*a*, 210-*b*.

Some wireless communications systems 200 have implemented some restrictions when it comes to multiplexing A-CSI on PUSCH repetitions 220. For example, in cases where a UCI message 235 which overlaps with at least one of the PUSCH repetitions 220 includes A-CSI, there may be some restrictions with multiplexing the A-CSI on the respective PUSCH repetitions. For example, in the context of s-DCI-based multi-TRP PUSCH repetition Type A, the UE 115-a may be expected to multiplex A-CSI on two PUSCH repetitions 220 only if UCIs other than the A-CSI are not multiplexed on any of the two PUSCH repetitions 220. Otherwise, the UE 115-a multiplexes A-CSI only on a first PUSCH repetition 220 of a set of linked PUSCH transmissions 215 (e.g., PUSCH repetition 220-a or 220-e). Thus, this restriction on multiplexing A-CSI with PUSCH repetitions 220 is based on what other type of data is multiplexed with the PUSCH repetitions 220.

In accordance with another restriction for multiplexing A-CSI, and in the context of s-DCI based multi-TRP PUSCH repetition Type A and B, the UE 115-a may support transmitting A-CSI on the first PUSCH repetition 220 corresponding to the first beam and the first PUSCH repetition 220 corresponding to the second beam when there is no transport block carried in the PUSCH. In other words, if the UCI message 235 is scheduled to carry A-CSI and overlaps with the set of linked PUSCH transmissions 215-a or 215-b, the UE 115-b may multiplex the A-CSI within the PUSCH repetitions 220-a and 220-b or the PUSCH repetitions 220-e and 220-g, respectively, if the PUSCH does not include a transport block. In such cases, the UE 115-a may assume that the number of repetitions of A-CSI multiplexed within the sets of linked PUSCH transmissions 215 is two regardless of the indicated number of PUSCH repetitions 220. Further, the UE 115-a may be expected to follow the above operation for transmitting A-CSI on two PUSCH repetitions 220 only if the first and second nominal repetitions are expected to be the same as the first and second actual repetitions, respectively (no segmentation) for PUSCH repetition Type B, and only if UCIs other than the A-CSI are not multiplexed on any of the two PUSCH repetitions 220 for PUSCH repetition Type A and B. Otherwise the UE 115-a may multiplex the A-CSI only on a first PUSCH repetition 220, as described previously herein. These restrictions and conditions for multiplexing A-CSI further assume that a scheduling offset for the UCI message 235/A-CSI meet applicable scheduling and processing timelines (e.g., satisfy Z and Z' requirements).

In some wireless communications systems (e.g., wireless communications systems 100, 200), multiplexing UCI message 235 on two PUSCH repetitions 220 associated with different beams (hence increasing the diversity) is possible only for the case of CSI and when CSI is requested in UL DCI message 210 (A-CSI). Comparatively, multiplexing UCI message 235 on two PUSCH repetitions 220 associated with different beams is not possible for other UCI messages 235 which are scheduled to carry other information, such as HARQ-ACK, periodic CSI (P-CSI), or semi-persistent CSI (SP-CSI). In this regard, conventional techniques for multiplexing UCI message 235 do not enable some information (HARQ-ACK, P-CSI, SP-CSI) included within a UCI message 235 that is originally scheduled on a PUCCH to be multiplexed with PUSCH repetitions 220. In this regard, in cases where a PUCCH (e.g., UCI message 235) overlaps with mTRP PUSCH repetitions 220 (as shown in FIG. 2), and given the restrictions for multiplexing A-CSI with PUSCH repetitions 220, conventional solutions do not specify if or how the UE 115-a may multiplex the UCI message 235 within the overlapping sets of linked PUSCH transmissions 215 associated with different beams.

Accordingly, the UE 115-a and the base station 105-a of the wireless communications system 200 may support a set of rules or configurations for determining how a PUCCH message (e.g., UCI message 235) which overlaps with a set of linked PUSCH transmissions 215 associated with multiple beams (e.g., mTRP PUSCH repetitions 220) may be multiplexed with the PUSCH repetitions 220. In particular, aspects of the present disclosure provide different rules/configurations for multiplexing PUCCH messages (e.g., UCI messages 235) with mTRP PUSCH repetitions 220 scheduled to carry A-CSI. Each of the UCI multiplexing configurations may define a set of rules for identifying which PUSCH repetitions 220 an overlapping PUCCH message may be multiplexed with. In other words, techniques described herein may be used to determine which PUSCH repetitions 220 of the respective sets of linked PUSCH transmissions 215 that the overlapping UCI message 235 may be multiplexed with. Moreover, aspects of the present disclosure are directed to a set of conditions which must be satisfied for multiplexing PUCCH messages with mTRP PUSCH repetitions 220, including conditions based on a length of the PUSCH repetitions 220, and information to be carried by each PUSCH repetition 220 (e.g., A-CSI, other control information).

For example, as shown in FIG. 2, the UE 115-a may receive control signaling (e.g., a first DCI message 210-c) from the base station 105-a, where the first DCI message 210-c schedules transmission of A-CSI via multiple uplink transmission repetitions. For instance, the DCI messages 210-a and 210-b illustrated in FIG. 2 may include examples of the first DCI message 210-c. In this regard, the first DCI message 210-c may schedule a set of linked PUSCH transmissions 215-a, 215-b including PUSCH repetitions 220 which are scheduled to include A-CSI. In some aspects, as illustrated in FIG. 2, the uplink transmission repetitions (e.g., PUSCH repetitions 220) may include a first set of uplink transmission repetitions (e.g., first set of PUSCH repetitions 220) associated with a first SRS resource set and/or first beam, and a second set of uplink transmission repetitions (e.g., second set of PUSCH repetitions 220) associated with a second SRS resource set and/or second beam. In some aspects, each of the linked PUSCH repetitions 220 may be scheduled on the same component carrier.

In some aspects, the UE 115-a may receive additional control signaling (e.g., a second DCI message 210-d) from the base station 105-a, where the additional control signaling (e.g., second DCI message 210-d) schedules transmission of an uplink control channel message that overlaps with at least one uplink transmission repetition (e.g., PUSCH repetition 220) scheduled via the first DCI message 210-c. In some aspects, the uplink control channel message may include a UCI message 235. For example, the second DCI message 210-d illustrated in FIG. 2 may schedule the UCI message 235, where the UCI message 235 overlaps with the PUSCH repetition 220-a and/or the PUSCH repetition 220-e.

The uplink control channel message (e.g., UCI message 235) may be scheduled to carry different types of information, including HARQ information, P-CSI, SP-CSI, or any combination thereof. In some aspects, the UCI message 235 may be scheduled on the same or different component carrier as the linked uplink transmission repetitions (e.g., PUSCH repetitions 220). For example, the UCI message 235 may be scheduled on a same or different component carrier as the first set of linked PUSCH transmissions 215-a.

In some aspects, the UE 115-*a* may multiplex the uplink control channel message (e.g., UCI message 235) with at least one uplink transmission repetition of the set of linked uplink transmission repetitions. For example, as shown in FIGS. 2, the UE 115-*a* may multiplex the overlapping UCI message 235 with at least one PUSCH repetition 220 of the set of linked PUSCH transmissions 215. In some aspects, only PUSCH repetitions 220 which are either overlapping with or subsequent to the UCI message 235 in the time domain may be considered for multiplexing. That is, PUSCH repetitions 220 that are earlier than the UCI message 235 in the time domain are not considered for multiplexing. In other words, the UE 115-*b* may not be configured to multiplex the UCI message 235 within PUSCH repetitions 220 which are scheduled prior to the UCI message 235 to ensure that there is no impact on the UCI multiplexing timeline. This concept will be described in further detail herein with respect to FIGS. 3-5.

The UE 115-*a* may be configured to implement one or more UCI multiplexing configurations to multiplex the UCI message 235 within one or more PUSCH repetitions 220. As it is used herein, a "UCI multiplexing configuration" may define a set of rules and/or conditions which control which PUSCH repetitions 220 will be multiplexed with the UCI message 235 and/or a quantity of PUSCH repetitions 220 which will be multiplexed with the UCI message 235. In this regard, different UCI multiplexing configurations may result in the UCI message 235 being multiplexed with different PUSCH repetitions 220. In some aspects, the respective UCI multiplexing configurations may be pre-configured at the UE 115-*a*, signaled to the UE 115-*a* (e.g., via RRC signaling), or both. Moreover, in some cases, a UE 115-*a* may be configured to signal (e.g., via UE capability signaling) one or more UCI multiplexing configurations which are supported by the UE 115-*a*.

For instance, in accordance with a first UCI multiplexing configuration, the UCI message 235 (originally scheduled on PUCCH) may be multiplexed on the first PUSCH repetition 220 associated with the first SRS resource set and on the first PUSCH repetition 220 associated with the second SRS resource set, assuming two conditions are met. For example, assuming the two conditions are met (which will be described in further detail herein), the UE 115-*a* may multiplex the UCI message 235 within the PUSCH repetitions 220-*a* and 220-*b* within the first set of linked PUSCH transmissions 215-*a*, or within the PUSCH repetitions 220-*e* and 220-*g* within the second set of linked PUSCH transmissions 215-*b*.

The first condition for multiplexing the UCI message 235 in accordance with the first UCI multiplexing configuration is that, for PUSCH repetition Type B, the lengths of the two actual PUSCH repetitions 220 are the same. In other words, in the context of PUSCH repetition Type B, the first condition may be satisfied if PUSCH repetitions 220-*a* and 220-*b* (or PUSCH repetitions 220-*e* and 220-*g*) are the same length. The second condition for multiplexing the UCI message 235 in accordance with the first UCI multiplexing configuration is that, for PUSCH repetition Type A or B, no other UCIs (whether A-CSI or some other UCI message 235) are multiplexed with the respective PUSCH repetitions 220 (e.g., PUSCH repetitions 220-*a* and 220-*b*, or PUSCH repetitions 220-*e* and 220-*g*). However, if there are other UCIs scheduled on the respective PUSCH repetitions, the second condition may be satisfied if the other UCIs are also repeated. For example, the second condition may be satisfied if another UCI, another A-CSI, or other control information (e.g., HARQ-ACK) is multiplexed on both PUSCH repetition 220-*a* and 220-*b*. In other words, {UCI, UCI}, {UCI+A-CSI, UCI+same A-CSI}, and {UCI+HARQ-ACK, UCI+same HARQ-ACK} would all satisfy the second condition. Comparatively, {UCI, UCI+A-CSI}, {UCI+HARQ-ACK, UCI}, and {UCI+HARQ-ACK, UCI+A-CSI} would not satisfy the second condition.

In cases where the UE 115-*a* is configured to apply the first UCI multiplexing configuration, but the first condition and/or the second condition are not satisfied, the UE 115-*a* may multiplex the UCI message 235 only on the first PUSCH repetition 220 that overlaps with the UCI message 235. For example, if the UE 115-*a* is configured to apply the first UCI multiplexing configuration, but the first condition and/or the second condition are not satisfied, the UE 115-*a* may multiplex the UCI message 235 only on the PUSCH repetition 220-*a* (but not on PUSCH repetition 220-*b*), or only on the PUSCH repetition 220-*e* (but not on PUSCH repetition 220-*g*).

Additional examples illustrating the first UCI multiplexing configuration are shown and described with reference to FIGS. 3-5 (e.g., first UCI multiplexing configuration 310-*a*, 410-*a*, 510-*a*).

In additional or alternative cases, the UE 115-*a* may be configured to apply a second UCI multiplexing configuration. In some cases, the second UCI multiplexing configuration may be the same as the first UCI multiplexing configuration (with the same two conditions explained above), except that after determining the two PUSCH repetitions 220 on which the UCI message 235 will be multiplexed, the UE 115-*a* multiplexes A-CSI (if requested by the first DCI message 210-*c* scheduling the PUSCH repetitions 220) on the same two PUSCH repetitions 220. Both the first and second conditions from the first UCI multiplexing configuration are required for the second UCI multiplexing configuration. However, the second UCI multiplexing configuration relaxes the second condition for "other UCIs" as the UE 115-*a* does not need to check for the presence of A-CSI within the PUSCH repetitions 220. That is, by design, the second UCI multiplexing configuration ensures that the repetitions of A-CSI scheduled to be transmitted within the PUSCH repetitions 220 are transmitted (and repeated) on the same PUSCH repetitions 220 on which the UCI message 235 will be multiplexed (e.g., ensures {UCI+A-CSI, UCI+same A-CSI} if A-CSI is requested).

Stated differently, with the first UCI multiplexing configuration, it may be assumed that the UE 115-*a* has already decided which PUSCH repetitions 220 will be used to transmit the repetitions of A-CSI, and therefore determines whether/how PUSCH repetitions 220 may be identified for multiplexing the UCI message 235. Comparatively, with the second UCI multiplexing configuration, the PUSCH repetitions 220 for A-CSI has not been decided, and the UE 115-*a* can make the decision for multiplexing both the A-CSI repetitions and the repetitions of the UCI message 235 on the determined PUSCH repetitions 220. In this regard, the presence of PUCCH (e.g., the presence of the UCI message 235 which is to be multiplexed) may determine which PUSCH repetitions 220 the A-CSI may be multiplexed on.

Additional examples illustrating the second UCI multiplexing configuration are shown and described with reference to FIGS. 3-5 (e.g., second UCI multiplexing configuration 310-*b*, 410-*b*, 510-*b*). These examples will be described in further detail herein.

In additional or alternative cases, the UE 115-*a* may be configured to apply a third UCI multiplexing configuration. In accordance with the third UCI multiplexing configuration, the UCI message 235 (which was originally scheduled on PUCCH) is multiplexed on the first PUSCH repetition 220 associated with the first SRS resource set and which does not include other multiplexed UCIs (e.g., A-CSI, HARQ-ACK), and on the first PUSCH repetition 220 associated with the second SRS resource set and which does not include other multiplexed UCIs (e.g., A-CSI, HARQ-ACK).

In the third UCI multiplexing configuration, the second condition is ensured by design. That is, the third UCI multiplexing configuration ensures that the UCI message 235 is not scheduled on PUSCH repetitions 220 which include other multiplexed UCIs, thereby ensuring satisfaction of the second condition. However, with the third UCI multiplexing configuration, the first condition (e.g., PUSCH repetitions 220 being the same length) needs to be satisfied for PUSCH repetition Type B (not applicable to PUSCH repetition Type A). In cases where the first UE 115-*a* implements the third UCI multiplexing configuration but where the first condition is not satisfied, the UE 115-*a* may multiplex the UCI message 235 only on the first PUSCH repetition that overlap with the UCI message 235 (e.g., multiplex the UCI message 235 on the PUSCH repetition 220-*a* or 220-*e*.

Additional examples illustrating the third UCI multiplexing configuration are shown and described with reference to FIGS. 3-5 (e.g., third UCI multiplexing configuration 310-*c*, 410-*c*, 510-*c*). These examples will be described in further detail herein.

In additional or alternative cases, the UE 115-*a* may be configured to apply a fourth UCI multiplexing configuration. In accordance with the fourth UCI multiplexing configuration, the UCI message 235 (which was originally scheduled on PUCCH) is multiplexed on the first PUSCH repetition 220 which does not include multiplexed A-CSI. With the fourth UCI multiplexing configuration, the UCI message 235 is not repeated within the PUSCH repetitions 220 (e.g., only one repetition of the UCI message 235 is multiplexed). However, the fourth UCI multiplexing configuration ensures that multiple repetitions of A-CSI may be multiplexed on the PUSCH repetitions 220.

In some cases, the fourth UCI multiplexing configuration may be viewed as a fallback to the third UCI multiplexing configuration. For example, if two PUSCH repetitions 220 associated with different SRS resource sets and without other multiplexed UCIs can not be found to satisfy the third UCI multiplexing configuration, then the UCI message 235 is multiplexed on only one PUSCH repetition 220 without A-CSI, as determined by the fourth UCI multiplexing configuration.

Additional examples illustrating the fourth UCI multiplexing configuration are shown and described with reference to FIGS. 3-5 (e.g., fourth UCI multiplexing configuration 310-*d*, 410-*d*, 510-*d*). These examples will be described in further detail herein.

As noted previously herein, the UE 115-*a* may be configured to apply one of the UCI multiplexing configurations. In cases where the UE 115-*a* supports multiple UCI multiplexing configurations, signaling from the network/base station 105-*a* may be used to determine which UCI multiplexing configuration is to be applied. For example, the first DCI message 210-*c* (e.g., DCI messages 210-*a*, 210-*b*) and/or the second DCI message 210-*d* may indicate which UCI multiplexing configuration is to be implemented.

In additional or alternative cases, the UE 115-*a* may select/determine which UCI multiplexing configuration is to be applied based on a quantity of PUSCH repetitions 220 which overlap with the scheduled UCI message 235 in the time domain. In particular, if X quantity of PUSCH repetitions 220 overlap with the UCI message 235, the value of X may be used to at least partially determine the UCI multiplexing behavior (e.g., determine which UCI multiplexing configuration is to be applied). For instance, the UE 115-*a* may be configured to follow one of the first, second, or third UCI multiplexing configurations if the value of X is greater than some threshold (e.g., X>thresh), and may be configured to follow the fourth UCI multiplexing configuration if the value of X is less than or equal to the threshold (e.g., X≤thresh). By way of another example, the UE 115-*a* may only consider the X quantity of PUSCH repetitions 220 which overlap with the UCI message 235 to determine one or two PUSCH repetitions 220 for UCI multiplexing. In such cases, PUSCH repetitions 220 which do not overlap with the UCI message 235 are not considered, and may not be used to multiplex the UCI message 235.

Continuing with reference to FIG. 2, the UE 115-*a* may transmit the set of uplink transmission repetitions (e.g., PUSCH repetitions 220) to the base station 105-*a*, where the set of uplink transmission repetitions include the multiple repetitions of A-CSI and the multiplexed UCI message 235. In other words, the set of PUSCH repetitions 220 may include the multiple repetitions of A-CSI which were originally scheduled to be transmitted by the PUSCH repetitions 220 via the first DCI message 210-*c* (e.g., DCI message 210-*a*, 210-*b*), as well as the one or more repetitions of the UCI message 235.

Techniques described herein may enable UCI messages 235 which overlap with one or more linked PUSCH repetitions 220 to be multiplexed on one or more of the linked PUSCH repetitions 220. As such, techniques provided herein may reduce control signaling overhead within the wireless communications system and may lead to more efficient utilization of resources.

Figure 3:
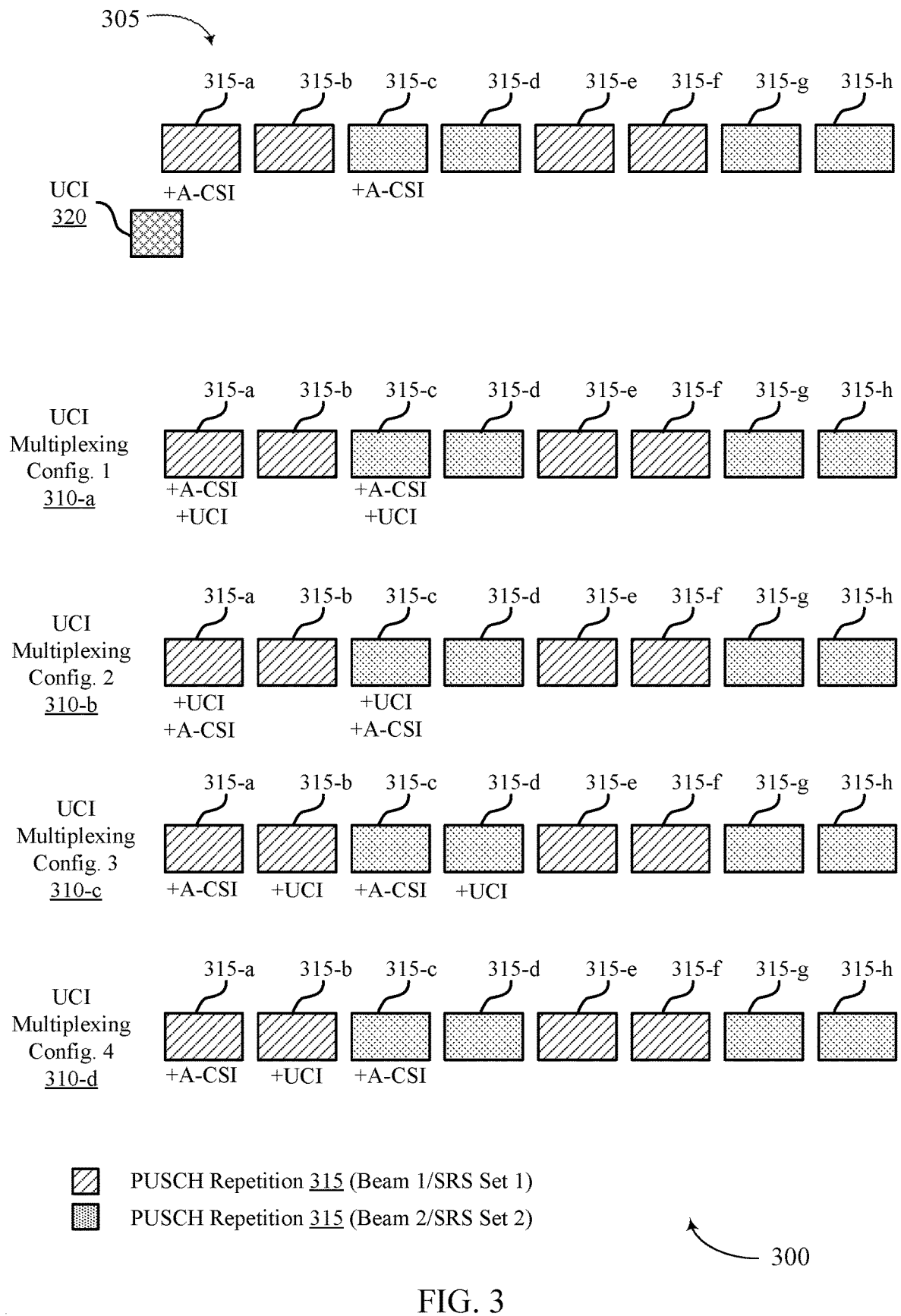
FIG. 3 illustrates an example of a resource configuration that supports techniques for multiplexing UCI on uplink channel repetitions in accordance with aspects of the present disclosure.

FIG. 3 illustrates an example of a resource configuration 300 that supports techniques for multiplexing UCI on uplink channel repetitions in accordance with aspects of the present disclosure. In some examples, resource configuration 300 may implement, or be implemented by, aspects of wireless communications system 100, wireless communications system 200, or both. In particular, resource configuration 300 illustrates a resource allocation scheme 305 which includes a UCI message 320 which overlaps with at least one PUSCH repetition 315 in the time domain. Resource configuration 300 further illustrates several examples as to how the UCI message 320 from the resource allocation scheme 305 may be multiplexed within the PUSCH repetitions 315 using different UCI multiplexing configurations 310 which may be implemented by the UE 115-*a*.

As shown in the resource allocation scheme 305, a UE 115 may be scheduled to transmit multiple PUSCH repetitions 315 (e.g., uplink transmission repetitions) which are associated with a first beam/first SRS resource set and a second beam/second SRS resource set. Further, the PUSCH repetitions 315 may be configured to include multiple repetitions of A-CSI. For example, as shown in FIG. 3, the PUSCH repetitions 315-*a* and 315-*c* may be configured to carry repetitions of A-CSI. Additionally, the UE 115 may receive control signaling which schedules a UCI message 320 which at least partially overlaps with at least one PUSCH repetition 315. In this regard, the PUSCH repetitions 315 and the UCI message 31 illustrated in FIG. 3 may include examples of the PUSCH repetitions 220 and the UCI message 235, respectively, illustrated in FIG. 2.

In accordance with the first UCI multiplexing configuration 310-*a*, the UCI message 320 may be multiplexed on the first PUSCH repetitions 315 associated with the first and second SRS resource sets assuming the two conditions are met (Condition 1: equal length PUSCH repetitions 315; Condition 2: no other multiplexed UCIs on the PUSCH repetitions 315, or other multiplexed UCIs are repeated on both PUSCH repetitions). As shown in FIG. 3, the second condition is satisfied, as the A-CSI is repeated on the first PUSCH repetition 315 associated with each respective SRS resource set (e.g., A-CSI is repeated on both PUSCH repetition 315-*a* and PUSCH repetition 315-*c*). Additionally, assuming the PUSCH repetitions 315-*a* and 315-*c* are the same length, the first condition is satisfied. As such, in accordance with the first UCI multiplexing configuration, the UCI message 320 is multiplexed on the first PUSCH repetition 315-*a* associated with the first SRS resource set and the first PUSCH repetition 315-*c* associated with the second SRS resource set.

Referring now to the second UCI multiplexing configuration 310-*b*, the first and second conditions (which are satisfied) apply to the second UCI multiplexing configuration 310-*b*, and are satisfied as described above. In accordance with the second UCI multiplexing configuration 310-*b*, and after determining the two PUSCH repetitions 315 on which the UCI message 320 will be multiplexed, the UE 115 multiplexes A-CSI on the same two PUSCH repetitions 315. In other words, the UE 115 would select the PUSCH repetitions 315-*a* and 315-*c* for multiplexing the UCI message 320, and would therefore multiplex the A-CSI on the same PUSCH repetitions 315. As such, for the resource allocation scheme 305 illustrated in FIG. 3, the second UCI multiplexing configuration results in the same UCI multiplexing behavior as the first UCI multiplexing configuration 310-*a*.

Referring now to the third UCI multiplexing configuration 310-*c*, the UCI message 320 is multiplexed on the first PUSCH repetition 315 associated with the first SRS resource set and which does not include other multiplexed UCIs (e.g., A-CSI, HARQ-ACK) (e.g., PUSCH repetition 315-*b*), and on the first PUSCH repetition 315 associated with the second SRS resource set and which does not include other multiplexed UCIs (e.g., A-CSI, HARQ-ACK) (e.g., PUSCH repetition 315-*d*). Accordingly, the presence of the A-CSI multiplexed on the PUSCH repetitions 315-*a* and 315-*c* changes the UCI multiplexing behavior of the third UCI multiplexing configuration 310-*c* relative to the first and second UCI multiplexing configurations.

Referring now to the fourth UCI multiplexing configuration 310-*d*, the UCI message 320 is multiplexed on the first PUSCH repetition 315 which does not include multiplexed A-CSI. In this regard, the UCI message 320 is multiplexed on the PUSCH repetition 315-*b*. Moreover, only one repetition of the UCI message 320 is multiplexed with the fourth UCI multiplexing configuration 310-*d*.

Figure 4:
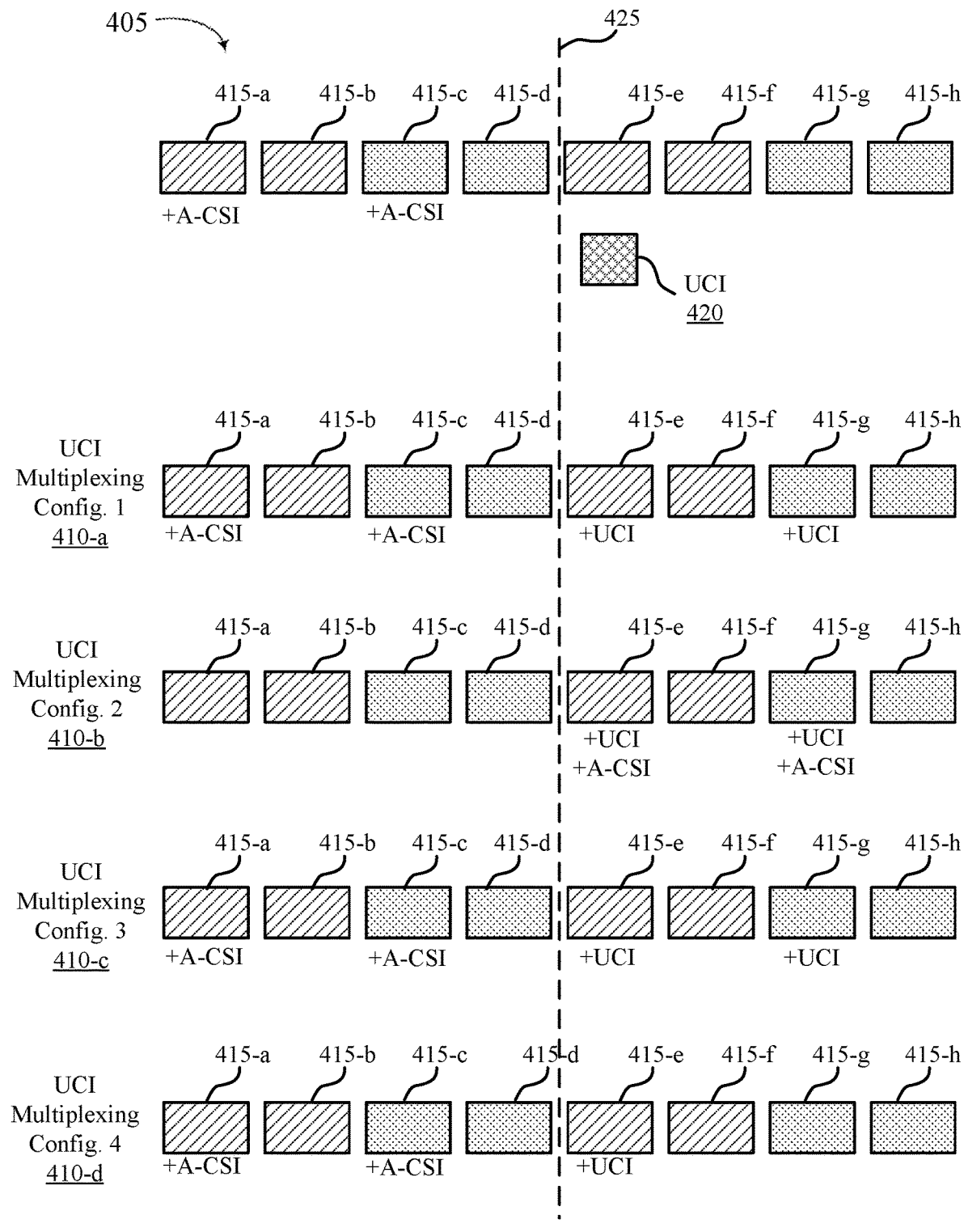
FIG. 4 illustrates an example of a resource configuration that supports techniques for multiplexing UCI on uplink channel repetitions in accordance with aspects of the present disclosure.

FIG. 4 illustrates an example of a resource configuration 400 that supports techniques for multiplexing UCI on uplink channel repetitions in accordance with aspects of the present disclosure. In some examples, resource configuration 400 may implement, or be implemented by, aspects of wireless communications system 100, wireless communications system 200, or both. In particular, resource configuration 400 illustrates a resource configuration scheme 405 which includes a UCI message 420 which overlaps with at least one PUSCH repetition 415 in the time domain. Resource configuration 400 further illustrates several examples as to how the UCI message 420 from the resource allocation scheme 405 may be multiplexed within the PUSCH repetitions 415 using different UCI multiplexing configurations 410 which may be implemented by the UE 115-*a*.

As shown in the resource allocation scheme 405, a UE 115 may be scheduled to transmit multiple PUSCH repetitions 415 (e.g., uplink transmission repetitions) which are associated with a first beam/first SRS resource set and a second beam/second SRS resource set. Further, the PUSCH repetitions 415 may be configured to include multiple repetitions of A-CSI. For example, as shown in FIG. 4, the PUSCH repetitions 415-*a* and 415-*c* may be configured to carry repetitions of A-CSI. Additionally, the UE 115 may receive control signaling which schedules a UCI message 420 which at least partially overlaps with at least one PUSCH repetition 415. In this regard, the PUSCH repetitions 315 and the UCI message 31 illustrated in FIG. 3 may include examples of the PUSCH repetitions 220 and the UCI message 235, respectively, illustrated in FIG. 2.

As noted previously herein, only PUSCH repetitions 415 which overlap with, or are subsequent to, the UCI message 420 in the time domain are considered for UCI multiplexing behavior. In other words, the UCI message 420 may not be multiplexed on any PUSCH repetitions 415 which are prior to (e.g., to the left of) the timeline 425 illustrated in FIG. 4. As may be seen by comparing the examples illustrated in FIG. 4 to the examples illustrated in FIG. 3, the relative position of the UCI message 420 relative to the PUSCH repetitions 415 may change the UCI multiplexing behavior.

In accordance with the first UCI multiplexing configuration 410-*a*, the UCI message 420 may be multiplexed on the first PUSCH repetitions 415 associated with the first and second SRS resource sets assuming the two conditions are met (Condition 1: equal length PUSCH repetitions 415; Condition 2: no other multiplexed UCIs on the PUSCH repetitions 415, or other multiplexed UCIs are repeated on both PUSCH repetitions). As shown in FIG. 4, the second condition is satisfied, as there is no A-CSI or other UCIs multiplexed on the first PUSCH repetition 415 associated with each respective SRS resource set following the UCI message 420. Additionally, assuming the PUSCH repetitions 415-*e* and 415-*g* are the same length, the first condition is satisfied. As such, in accordance with the first UCI multiplexing configuration, the UCI message 420 is multiplexed on the first PUSCH repetition 415-*e* associated with the first SRS resource set following the UCI message 420, and the first PUSCH repetition 415-*g* associated with the second SRS resource set following the UCI message 420.

Referring now to the second UCI multiplexing configuration 410-*b*, the first and second conditions (which are satisfied) apply to the second UCI multiplexing configuration 410-*b*, and are satisfied as described above. In accordance with the second UCI multiplexing configuration 410-*b*, and after determining the two PUSCH repetitions 415 on which the UCI message 420 will be multiplexed, the UE 115 multiplexes A-CSI on the same two PUSCH repetitions 420. In other words, the UE 115 would select the PUSCH repetitions 415-*e* and 415-*g* for multiplexing the UCI message 420, and would therefore multiplex the A-CSI on the same PUSCH repetitions 415. With the second UCI multiplexing configuration 410-*b*, the UE 115 may change the PUSCH repetitions 415 on which the A-CSI was originally scheduled, as shown in FIG. 4.

Referring now to the third UCI multiplexing configuration 410-*c*, the UCI message 420 is multiplexed on the first PUSCH repetition 415 associated with the first SRS resource set following the UCI message 420 and which does not include other multiplexed UCIs (e.g., A-CSI, HARQ-ACK) (e.g., PUSCH repetition 415-*b*), and on the first PUSCH repetition 415 associated with the second SRS resource set following the UCI message 420 and which does not include other multiplexed UCIs (e.g., A-CSI, HARQ-ACK) (e.g., PUSCH repetition 415-*d*). Because there are no A-CSIs scheduled following the UCI message 420, the UCI message 420 is scheduled on the PUSCH repetitions 415-*e* and 415-*g*, resulting in the same UCI multiplexing behavior as the first UCI multiplexing configuration 410-*a*.

Referring now to the fourth UCI multiplexing configuration 410-*d*, the UCI message 420 is multiplexed on the first PUSCH repetition 415 following the UCI message 420 which does not include multiplexed A-CSI. In this regard, the UCI message 420 is multiplexed on the PUSCH repetition 415-*e*. Moreover, only one repetition of the UCI message 420 is multiplexed with the fourth UCI multiplexing configuration 410-*d*.

Figure 5:
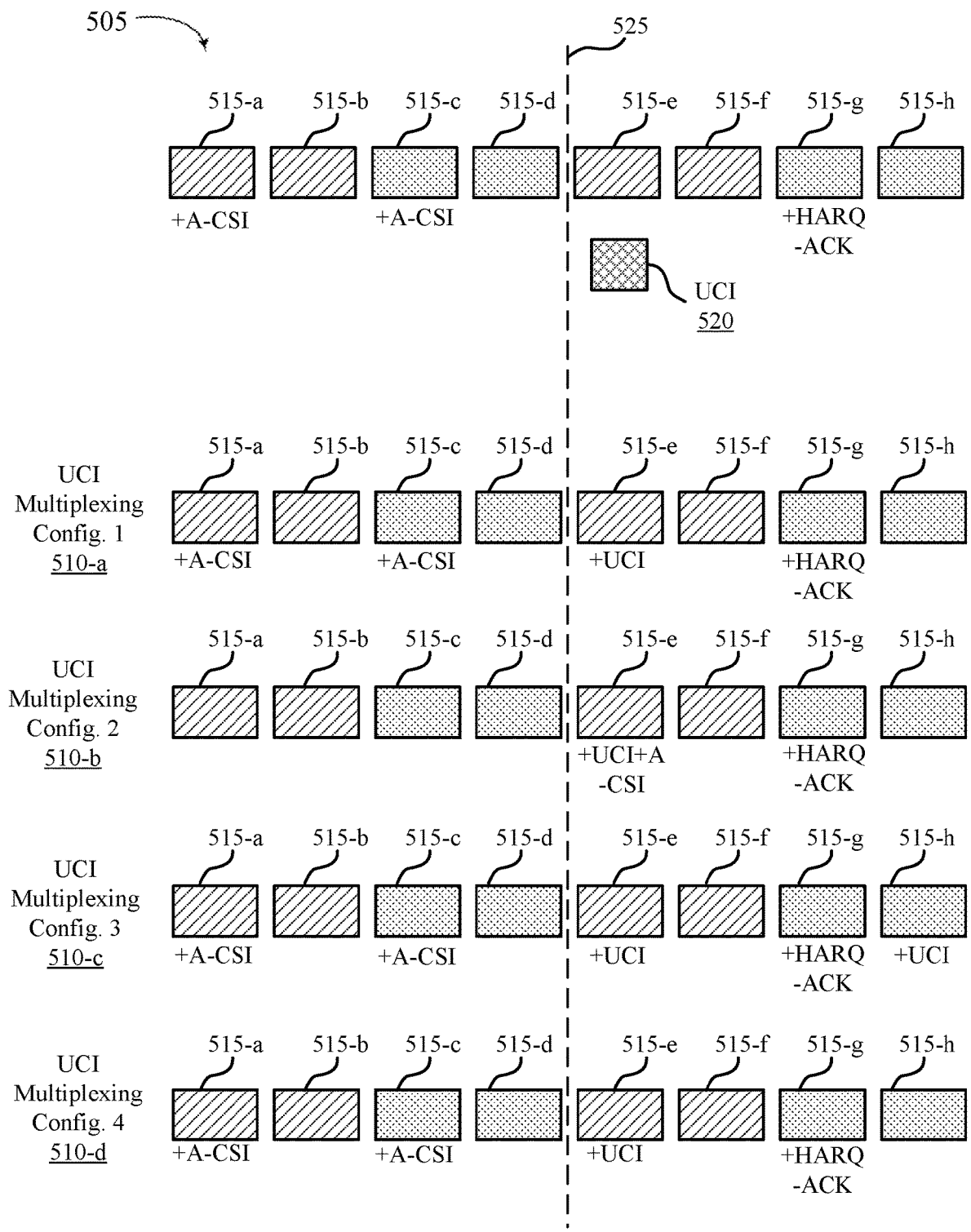
FIG. 5 illustrates an example of a resource configuration that supports techniques for multiplexing UCI on uplink channel repetitions in accordance with aspects of the present disclosure.

FIG. 5 illustrates an example of a resource configuration 500 that supports techniques for multiplexing UCI on uplink channel repetitions in accordance with aspects of the present disclosure. *In some examples, resource configuration 500 may implement, or be implemented by, aspects of wireless communications system 100, wireless communications system 200, or both. In particular, resource configuration 500 illustrates a resource configuration scheme 505 which includes a UCI message 520 which overlaps with at least one PUSCH repetition 515 in the time domain. Resource configuration 500 further illustrates several examples as to how the UCI message 520 from the resource allocation scheme 505 may be multiplexed within the PUSCH repetitions 515 using different UCI multiplexing configurations 510 which may be implemented by the UE 115-*a*.

As shown in the resource allocation scheme 505, a UE 115 may be scheduled to transmit multiple PUSCH repetitions 515 (e.g., uplink transmission repetitions) which are associated with a first beam/first SRS resource set and a second beam/second SRS resource set. Further, the PUSCH repetitions 515 may be configured to include multiple repetitions of A-CSI. For example, as shown in FIG. 4, the PUSCH repetitions 515-*a* and 515-*c* may be configured to carry repetitions of A-CSI. Additionally, the UE 115 may receive control signaling which schedules a UCI message 520 which at least partially overlaps with at least one PUSCH repetition 515. Further, the UE 115 may be scheduled to transmit HARQ-ACK information via the PUSCH repetition 515-*g*. In this regard, the PUSCH repetitions 315 and the UCI message 31 illustrated in FIG. 5 may include examples of the PUSCH repetitions 220 and the UCI message 235, respectively, illustrated in FIG. 2.

As noted previously herein, only PUSCH repetitions 515 which overlap with, or are subsequent to, the UCI message 520 in the time domain are considered for UCI multiplexing behavior. In other words, the UCI message 520 may not be multiplexed on any PUSCH repetitions 515 which are prior to (e.g., to the left of) the timeline 525 illustrated in FIG. 5. As may be seen by comparing the examples illustrated in FIG. 5 to the examples illustrated in FIGS. 3 and 4, the relative position of the UCI message 520 relative to the PUSCH repetitions 515 and the presence of the HARQ-ACK information (or other control information, such as P-CSI, SP-CSI) may change the UCI multiplexing behavior.

In accordance with the first UCI multiplexing configuration 510-*a*, the UCI message 520 may be multiplexed on the first PUSCH repetitions 515 associated with the first and second SRS resource sets assuming the two conditions are met (Condition 1: equal length PUSCH repetitions 515; Condition 2: no other multiplexed UCIs on the PUSCH repetitions 515, or other multiplexed UCIs are repeated on both PUSCH repetitions 515). As shown in FIG. 5, the second condition is not satisfied, as the HARQ-ACK is scheduled to be transmitted on PUSCH repetition 515-*g*, but is not repeated on PUSCH repetition 515-*e*. As such, because the second condition is not satisfied, the UE 115-*a* may multiplex the UCI message 520 only on the first PUSCH repetition 515 that overlaps with the UCI message 520, which is PUSCH repetition 515-*e*.

Referring now to the second UCI multiplexing configuration 510-*b*, the second condition is not satisfied, as described above. As such, the UCI message 520 is multiplexed on PUSCH repetition 515-*e*, as described above. Moreover, in accordance with the second UCI multiplexing configuration 510-*b*, the A-CSI is multiplexed on the same PUSCH repetitions 515 which are selected to include the multiplexed UCI message 520. As such, both the UCI message 520 and the A-CSI are multiplexed on the PUSCH repetition 515-*e* in accordance with the second UCI multiplexing configuration 510-*b*.

Referring now to the third UCI multiplexing configuration 510-*c*, the UCI message 520 is multiplexed on the first PUSCH repetition 515 associated with the first SRS resource set following the UCI message 520 and which does not include other multiplexed UCIs (e.g., A-CSI, HARQ-ACK) (e.g., PUSCH repetition 515-*e*), and on the first PUSCH repetition 515 associated with the second SRS resource set following the UCI message 520 and which does not include other multiplexed UCIs (e.g., A-CSI, HARQ-ACK) (e.g., PUSCH repetition 515-*h*). Accordingly, the UCI message 520 is multiplexed on the PUSCH repetition 515-*e* (e.g., first PUSCH repetition 515 of the first SRS resource set without other multiplexed UCIs) and on the PUSCH repetition 515-*h* (e.g., first PUSCH repetition 515 of the second SRS resource set without other multiplexed UCIs).

Referring now to the fourth UCI multiplexing configuration 510-*d*, the UCI message 520 is multiplexed on the first PUSCH repetition 515 following the UCI message 520 which does not include multiplexed A-CSI. In this regard, the UCI message 520 is multiplexed on the PUSCH repetition 515-*e*. Moreover, only one repetition of the UCI message 520 is multiplexed with the fourth UCI multiplexing configuration 510-*d*.

Figure 6:
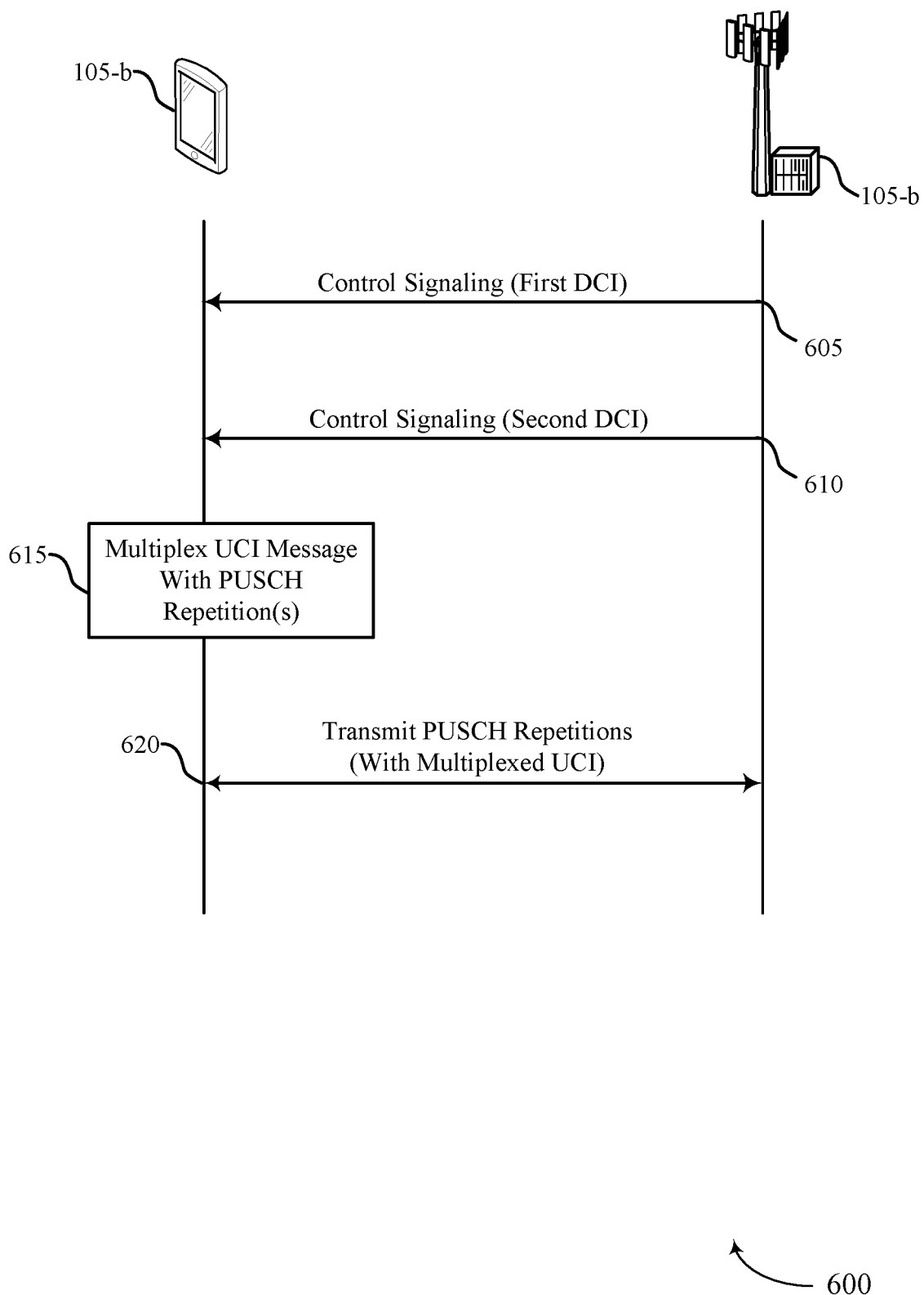
FIG. 6 illustrates an example of a process flow that supports techniques for multiplexing UCI on uplink channel repetitions in accordance with aspects of the present disclosure.

FIG. 6 illustrates an example of a process flow 600 that supports techniques for multiplexing UCI on uplink channel repetitions in accordance with aspects of the present disclosure. In some examples, process flow 600 may implement, or be implemented by, aspects of wireless communications system 100, wireless communications system 200, resource configuration 300, resource configuration 400, resource configuration 500, or any combination thereof. For example, the process flow 600 may illustrate a UE 115-*b* receiving control signaling scheduling uplink transmission repetitions, receiving additional control signaling scheduling an uplink control channel message, and multiplexing the uplink control channel message with at least one uplink transmission repetition, as described with reference to FIGS. 1-5.

In some cases, process flow 600 may include a UE 115-*b* and a base station 105-*b*, which may be examples of corresponding devices as described herein. In particular, the UE 115-*b* and the base station 105-*b* illustrated in FIG. 6 may include examples of the UE 115-*a* and the base station 105-*a* illustrated in FIG. 2.

In some examples, the operations illustrated in process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 605, the UE 115-*b* may receive, from the base station 105-*b*, control signaling (e.g., a first DCI message) which schedules transmission of A-CSI via multiple uplink transmission repetitions. For example, the UE 115-*b* may receive a DCI message which schedules a set of linked PUSCH transmissions which are scheduled to include A-CSI. In some aspects, the uplink transmission repetitions (e.g., PUSCH repetitions) may include a first set of uplink transmission repetitions (e.g., first set of PUSCH repetitions) associated with a first SRS resource set and/or first beam, and a second set of uplink transmission repetitions (e.g., second set of PUSCH repetitions) associated with a second SRS resource set and/or second beam. In some aspects, each of the linked PUSCH repetitions may be scheduled on the same component carrier.

At 610, the UE 115-*b* may receive additional control signaling (e.g., second DCI message) from the base station 105-*b*, where the additional control signaling schedules transmission of an uplink control channel message that overlaps with at least one uplink transmission repetition scheduled via the control signaling received at 605. In some aspects, the uplink control channel message may include a UCI message. For example, as shown in FIG. 2, the UE 115-*b* may receive additional control signaling (e.g., second DCI message) which schedules the UCI message 235 which overlaps in the time domain with at least the PUSCH repetition 220-*a* and/or PUSCH repetition 220-*e*.

As described previously herein, the uplink control channel message (e.g., UCI message) may be scheduled to carry different types of information, including HARQ information, P-CSI, SP-CSI, or any combination thereof. In some aspects, the uplink control channel message may be scheduled on the same or different component carrier as the linked uplink transmission repetitions (e.g., PUSCH repetitions).

At 615, the UE 115-*b* may multiplex the uplink control channel message (e.g., UCI message) with at least one uplink transmission repetition of the set of linked uplink transmission repetitions. For example, as shown in FIGS. 2-5, the UE 115-*b* may multiplex the overlapping UCI message with at least one PUSCH repetition of the set of linked PUSCH transmissions. As described previously herein, the UE 115-*b* may multiplex the UCI message in accordance with one or more UCI multiplexing configurations. In this regard, the UCI multiplexing configurations may be used to determine which uplink transmission repetitions (and quantity of uplink transmission repetitions) will be multiplexed with the uplink control channel message based on a number of characteristics/parameters, including lengths of the respective uplink transmission repetitions, other control information scheduled to be transmitted within the uplink transmission repetitions, or a quantity of uplink transmission repetitions which overlap with the uplink control channel message in the time domain.

At 620, the UE 115-*b* may transmit the set of uplink transmission repetitions to the base station 105-*b*, where the set of uplink transmission repetitions include the multiple repetitions of A-CSI and the multiplexed uplink control channel message. In other words, the set of uplink transmission repetitions (e.g., PUSCH repetitions) may include the multiple repetitions of A-CSI which were originally scheduled to be transmitted via the uplink transmission repetitions, as well as the one or more repetitions of the uplink control channel message which were multiplexed at 615.

Techniques described herein may enable UCI messages which overlap with one or more linked PUSCH repetitions to be multiplexed on one or more of the linked PUSCH repetitions. As such, techniques provided herein may reduce control signaling overhead within the wireless communications system and may lead to more efficient utilization of resources.

Figure 7:
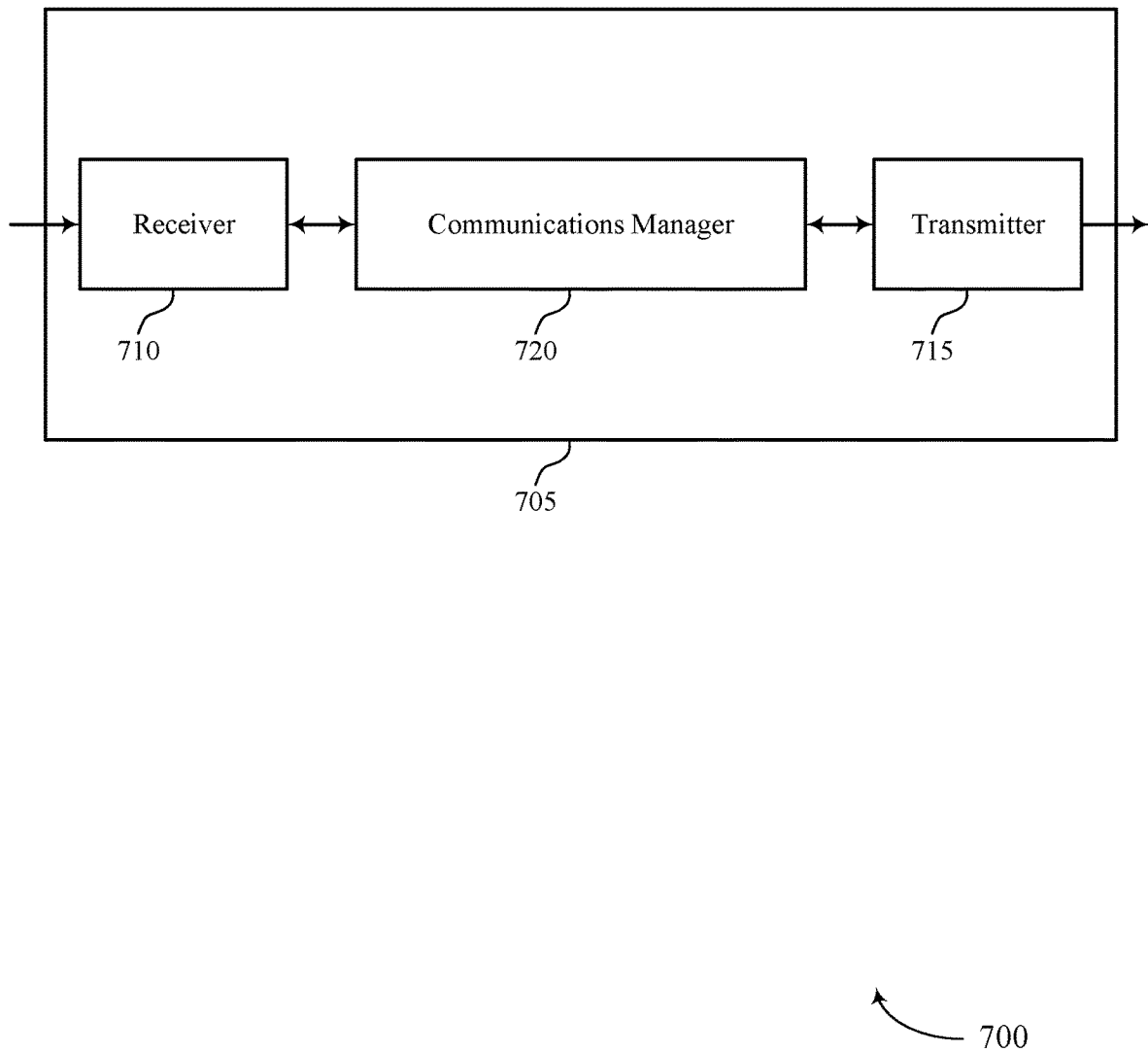
FIGS. 7 and 8 show block diagrams of devices that support techniques for multiplexing UCI on uplink channel repetitions in accordance with aspects of the present disclosure.

FIG. 7 shows a block diagram 700 of a device 705 that supports techniques for multiplexing UCI on uplink channel repetitions in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for multiplexing UCI on uplink channel repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for multiplexing UCI on uplink channel repetitions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for multiplexing UCI on uplink channel repetitions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The communications manager 720 may be configured as or otherwise support a means for receiving, from the base station, additional control signaling scheduling transmission of an uplink control channel message that overlaps in time with at least one uplink transmission repetition of the set of multiple uplink transmission repetitions. The communications manager 720 may be configured as or otherwise support a means for multiplexing the uplink control channel message with at least one uplink transmission repetition of the set of multiple uplink transmission repetitions. The communications manager 720 may be configured as or otherwise support a means for transmitting the set of multiple uplink transmission repetitions including a set of multiple repetitions of the A-CSI and the multiplexed uplink control channel message.

By including or configuring the communications manager 720 in accordance with examples as described herein, the device 705 (e.g., a processor controlling or otherwise coupled to the receiver 710, the transmitter 715, the communications manager 720, or a combination thereof) may support techniques which may enable UCI messages which overlap with one or more linked PUSCH repetitions to be multiplexed on one or more of the linked PUSCH repetitions. As such, techniques provided herein may reduce control signaling overhead within the wireless communications system 100 and may lead to more efficient utilization of resources.

Figure 8:
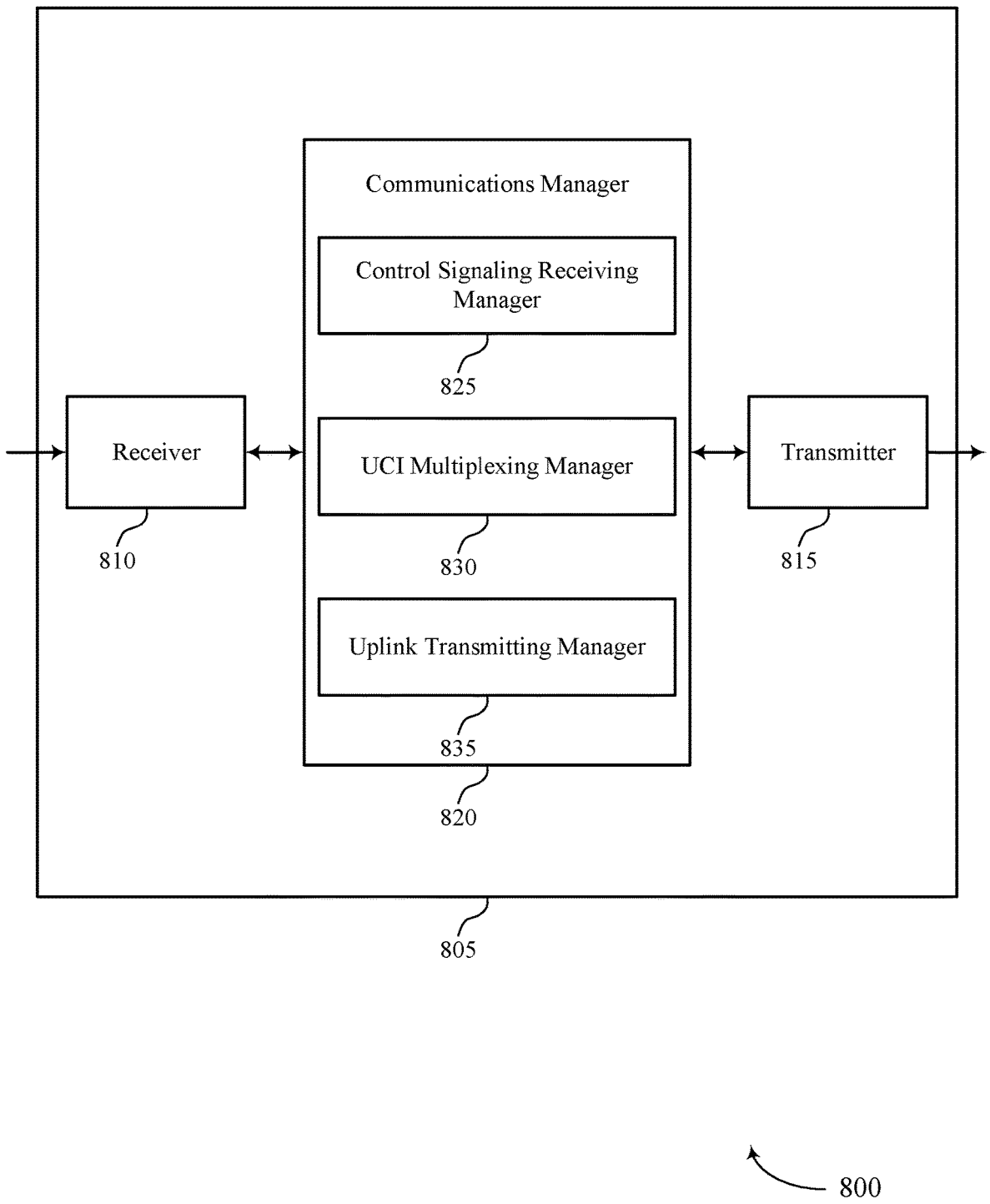

FIG. 8 shows a block diagram 800 of a device 805 that supports techniques for multiplexing UCI on uplink channel repetitions in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for multiplexing UCI on uplink channel repetitions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for multiplexing UCI on uplink channel repetitions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for multiplexing UCI on uplink channel repetitions as described herein. For example, the communications manager 820 may include a control signaling receiving manager 825, a UCI multiplexing manager 830, an uplink transmitting manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The control signaling receiving manager 825 may be configured as or otherwise support a means for receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The control signaling receiving manager 825 may be configured as or otherwise support a means for receiving, from the base station, additional control signaling scheduling transmission of an uplink control channel message that overlaps in time with at least one uplink transmission repetition of the set of multiple uplink transmission repetitions. The UCI multiplexing manager 830 may be configured as or otherwise support a means for multiplexing the uplink control channel message with at least one uplink transmission repetition of the set of multiple uplink transmission repetitions. The uplink transmitting manager 835 may be configured as or otherwise support a means for transmitting the set of multiple uplink transmission repetitions including a set of multiple repetitions of the A-CSI and the multiplexed uplink control channel message.

Figure 9:
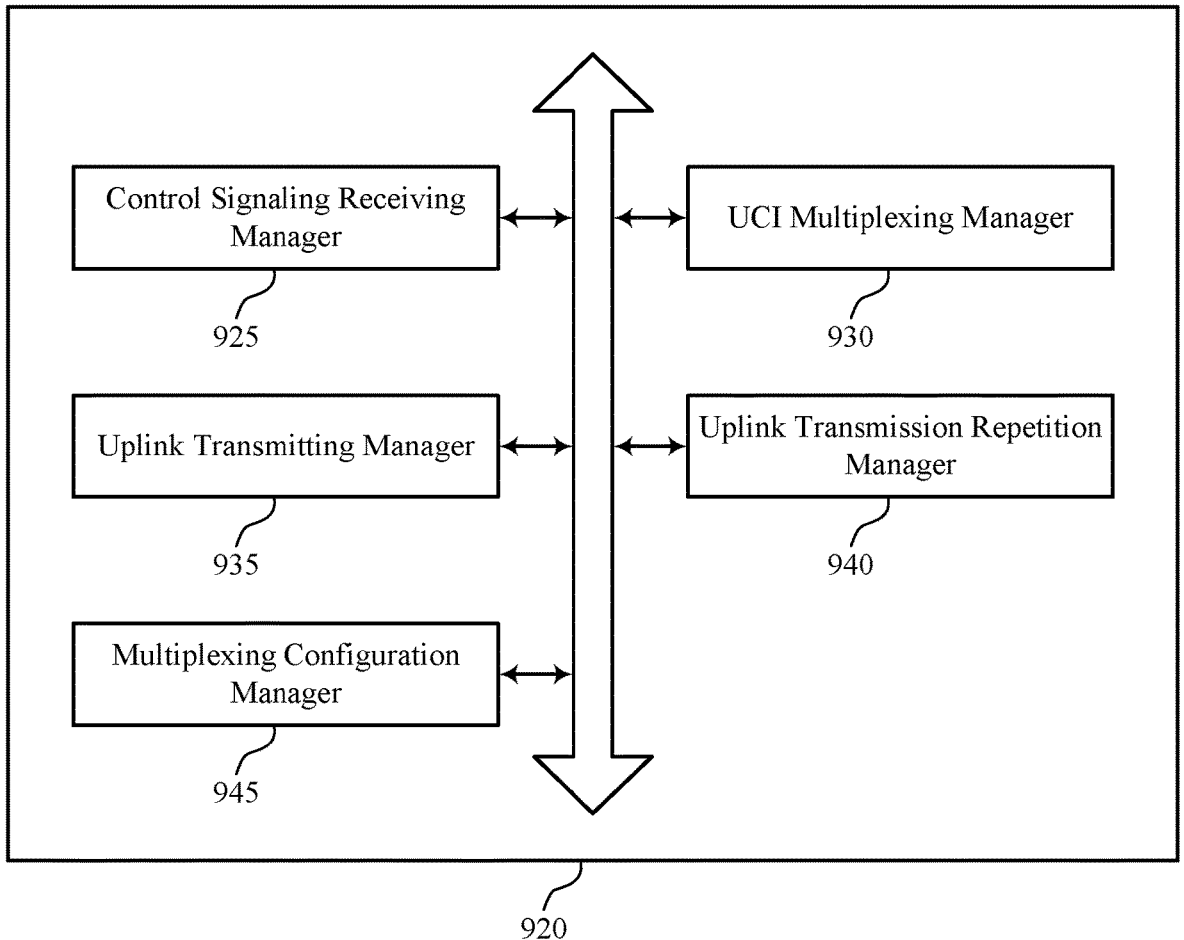
FIG. 9 shows a block diagram of a communications manager that supports techniques for multiplexing UCI on uplink channel repetitions in accordance with aspects of the present disclosure.

FIG. 9 shows a block diagram 900 of a communications manager 920 that supports techniques for multiplexing UCI on uplink channel repetitions in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for multiplexing UCI on uplink channel repetitions as described herein. For example, the communications manager 920 may include a control signaling receiving manager 925, a UCI multiplexing manager 930, an uplink transmitting manager 935, an uplink transmission repetition manager 940, a multiplexing configuration manager 945, or any combination thereof. Each of these components may communicate, directly or indirectly, with one another (e.g., via one or more buses).

The communications manager 920 may support wireless communication at a UE in accordance with examples as disclosed herein. The control signaling receiving manager 925 may be configured as or otherwise support a means for receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. In some examples, the control signaling receiving manager 925 may be configured as or otherwise support a means for receiving, from the base station, additional control signaling scheduling transmission of an uplink control channel message that overlaps in time with at least one uplink transmission repetition of the set of multiple uplink transmission repetitions. The UCI multiplexing manager 930 may be configured as or otherwise support a means for multiplexing the uplink control channel message with at least one uplink transmission repetition of the set of multiple uplink transmission repetitions. The uplink transmitting manager 935 may be configured as or otherwise support a means for transmitting the set of multiple uplink transmission repetitions including a set of multiple repetitions of the A-CSI and the multiplexed uplink control channel message.

In some examples, to support multiplexing the uplink control channel message, the UCI multiplexing manager 930 may be configured as or otherwise support a means for multiplexing a first repetition of the uplink control channel message via a first uplink channel repetition of the first set of repetitions which follows in time the scheduled uplink control channel message. In some examples, to support multiplexing the uplink control channel message, the UCI multiplexing manager 930 may be configured as or otherwise support a means for multiplexing a second repetition of the uplink control channel message via a first uplink channel repetition of the second set of repetitions which follows in time the scheduled uplink control channel message.

In some examples, the UCI multiplexing manager 930 may be configured as or otherwise support a means for multiplexing the first repetition and the second repetition based on a first length of the first uplink channel repetition of the first set of repetitions being equal to a second length of the first uplink channel repetition of the second set of repetitions.

In some examples, the UCI multiplexing manager 930 may be configured as or otherwise support a means for multiplexing the first repetition and the second repetition based on an absence of additional uplink control channel messages multiplexed with the first uplink channel repetition of the first set of repetitions and the first uplink channel repetition of the second set of repetitions.

In some examples, the UCI multiplexing manager 930 may be configured as or otherwise support a means for multiplexing the first repetition and the second repetition based on an additional uplink control channel message being multiplexed with both the first uplink channel repetition of the first set of repetitions and the first uplink channel repetition of the second set of repetitions.

In some examples, the uplink transmitting manager 935 may be configured as or otherwise support a means for transmitting a first repetition of the A-CSI via the first uplink channel repetition of the first set of repetitions which follows in time the scheduled uplink control channel message. In some examples, the uplink transmitting manager 935 may be configured as or otherwise support a means for transmitting a second repetition of the A-CSI via the first uplink channel repetition of the second set of repetitions which follows in time the scheduled uplink control channel message.

In some examples, to support multiplexing the uplink control channel message, the UCI multiplexing manager 930 may be configured as or otherwise support a means for multiplexing a first repetition of the uplink control channel message via a first uplink channel repetition of the first set of repetitions which follows in time the scheduled uplink control channel message and which does not include a repetition of the A-CSI or other multiplexed uplink control channel messages.

In some examples, to support multiplexing the uplink control channel message, the UCI multiplexing manager 930 may be configured as or otherwise support a means for multiplexing a second repetition of the uplink control channel messages via a first uplink channel repetition of the second set of repetitions which follows in time the scheduled uplink control channel message and which does not include a repetition of the A-CSI or other multiplexed uplink control channel messages.

In some examples, to support multiplexing the uplink control channel message, the uplink transmission repetition manager 940 may be configured as or otherwise support a means for identifying a quantity of uplink transmission repetitions of the set of multiple uplink transmission repetitions which overlap in time with the uplink control channel repetition, where multiplexing the uplink control channel message is based on the quantity of uplink transmission repetitions.

In some examples, to support multiplexing the uplink control channel message, the multiplexing configuration manager 945 may be configured as or otherwise support a means for identifying a UCI multiplexing configuration from a set of multiple UCI multiplexing configurations supported by the UE based on the quantity of uplink transmission repetitions of the set of multiple uplink transmission repetitions which overlap in time with the uplink control channel repetition, the UCI multiplexing configuration governing multiplexing of the uplink control channel message with the at least one uplink transmission repetition of the set of multiple uplink transmission repetitions.

In some examples, to support transmitting the set of multiple uplink channel repetitions including the set of multiple repetitions of the A-CSI, the uplink transmitting manager 935 may be configured as or otherwise support a means for transmitting a first repetition of the A-CSI via a first uplink channel repetition of the first set of repetitions and a second repetition of the A-CSI via a first uplink channel repetition of the second set of repetitions.

In some examples, the uplink control channel message includes a UCI message. In some examples, the uplink control channel message includes HARQ information, P-CSI, SP-CSI, or any combination thereof. In some examples, the set of multiple uplink transmission repetitions and the uplink control channel message are scheduled on the same uplink component carrier. In some examples, the set of multiple uplink transmission repetitions are scheduled on a first uplink component carrier. In some examples, the uplink control channel message is scheduled on a second uplink component carrier which is different from the first uplink component carrier.

Figure 10:
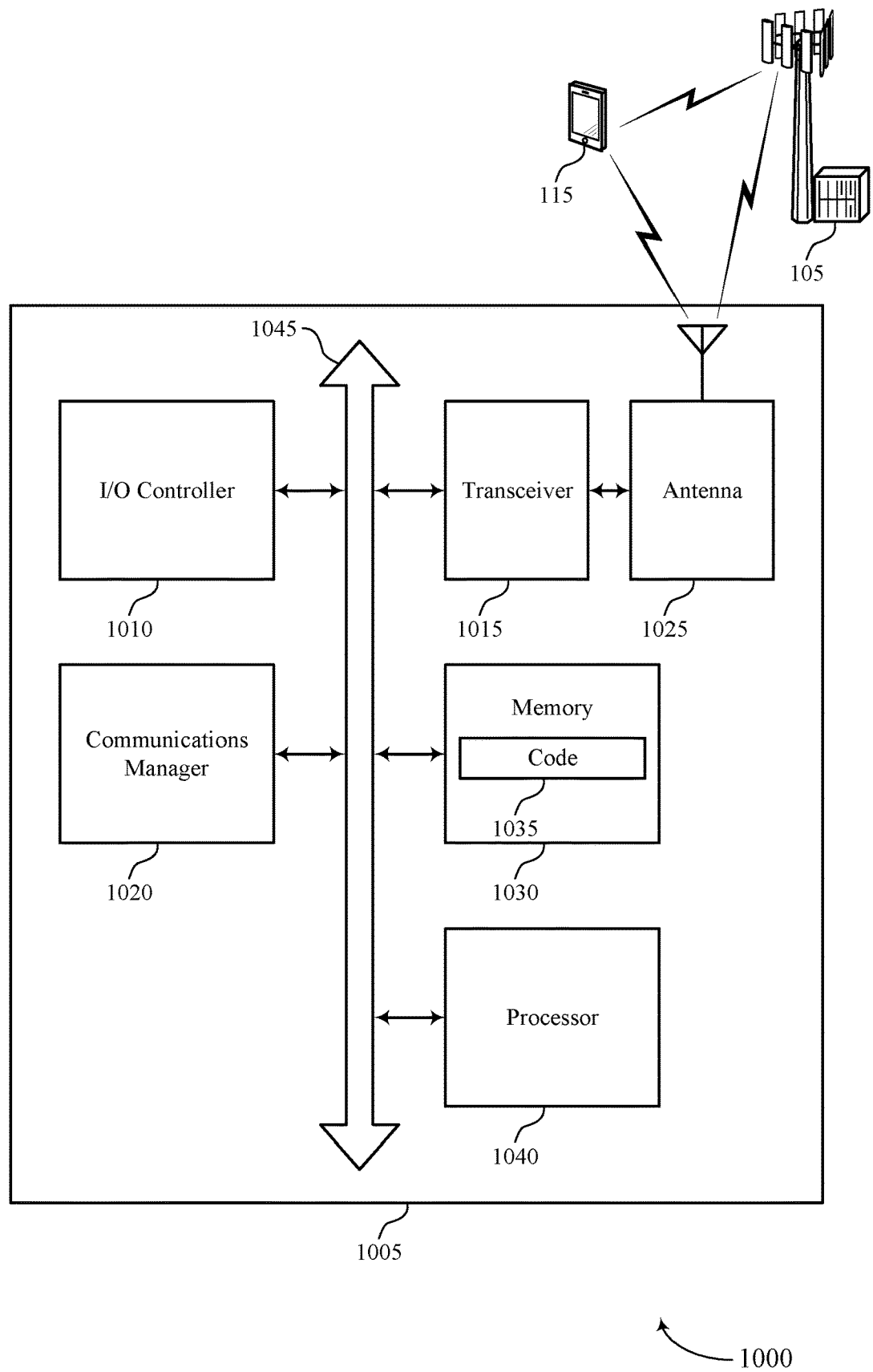
FIG. 10 shows a diagram of a system including a device that supports techniques for multiplexing UCI on uplink channel repetitions in accordance with aspects of the present disclosure.

FIG. 10 shows a diagram of a system 1000 including a device 1005 that supports techniques for multiplexing UCI on uplink channel repetitions in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for multiplexing UCI on uplink channel repetitions). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The communications manager 1020 may be configured as or otherwise support a means for receiving, from the base station, additional control signaling scheduling transmission of an uplink control channel message that overlaps in time with at least one uplink transmission repetition of the set of multiple uplink transmission repetitions. The communications manager 1020 may be configured as or otherwise support a means for multiplexing the uplink control channel message with at least one uplink transmission repetition of the set of multiple uplink transmission repetitions. The communications manager 1020 may be configured as or otherwise support a means for transmitting the set of multiple uplink transmission repetitions including a set of multiple repetitions of the A-CSI and the multiplexed uplink control channel message.

By including or configuring the communications manager 1020 in accordance with examples as described herein, the device 1005 may support techniques which may enable UCI messages which overlap with one or more linked PUSCH repetitions to be multiplexed on one or more of the linked PUSCH repetitions. As such, techniques provided herein may reduce control signaling overhead within the wireless communications system 100, which may lead to more efficient utilization of resources, reduced power consumption, and longer battery life. and may lead to more efficient utilization of resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for multiplexing UCI on uplink channel repetitions as described herein, or the processor 1040 and the memory 1030 may be otherwise configured to perform or support such operations.

Figure 11:
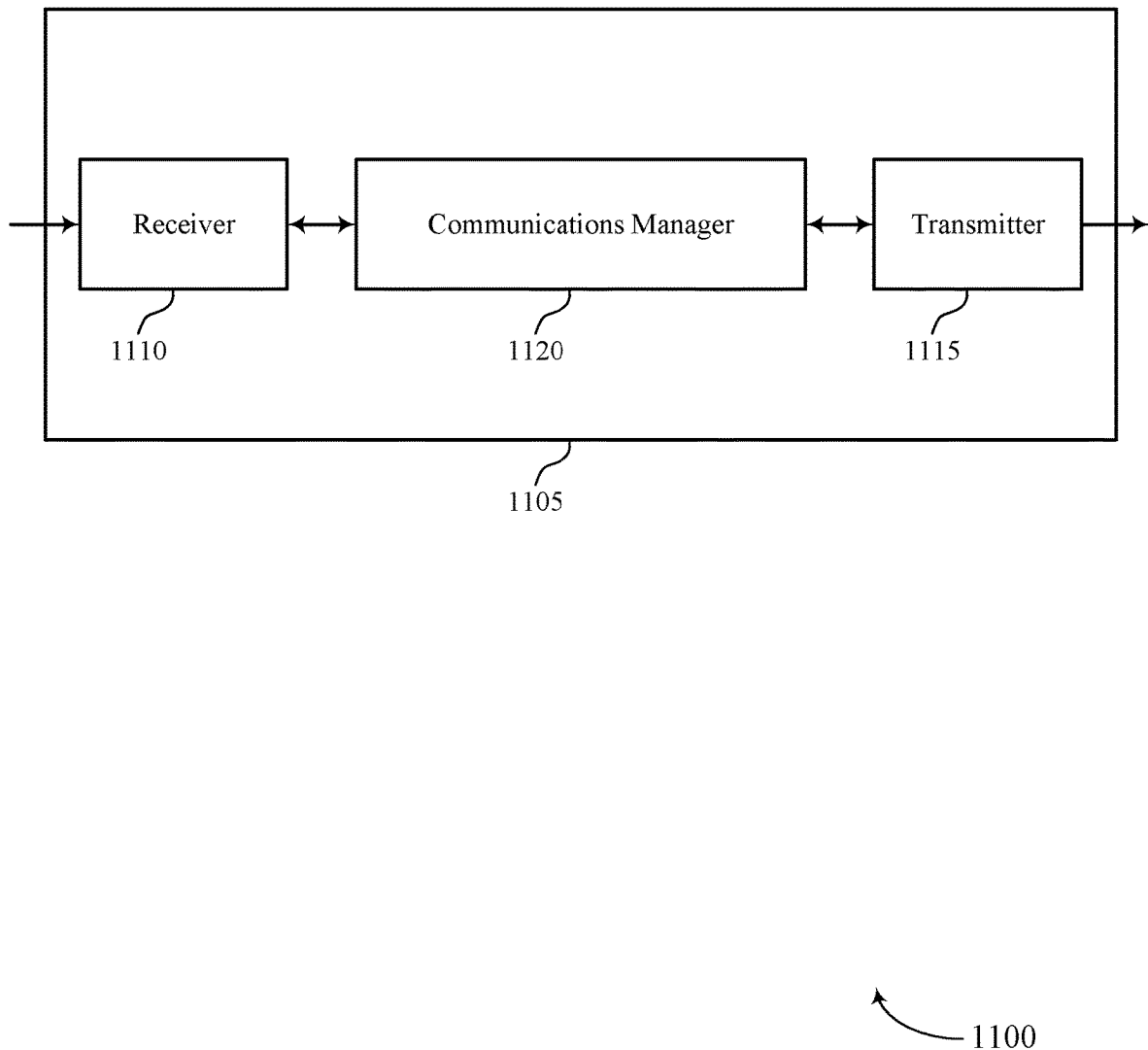
FIGS. 11 and 12 show block diagrams of devices that support techniques for multiplexing UCI on uplink channel repetitions in accordance with aspects of the present disclosure.

FIG. 11 shows a block diagram 1100 of a device 1105 that supports techniques for multiplexing UCI on uplink channel repetitions in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for multiplexing UCI on uplink channel repetitions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for multiplexing UCI on uplink channel repetitions). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for multiplexing UCI on uplink channel repetitions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The communications manager 1120 may be configured as or otherwise support a means for transmitting, to the UE, additional control signaling scheduling transmission of an uplink control channel message that overlaps in time with at least one uplink transmission repetition of the set of multiple uplink transmission repetitions. The communications manager 1120 may be configured as or otherwise support a means for receiving the set of multiple uplink transmission repetitions including a set of multiple repetitions of the A-CSI and the uplink control channel message multiplexed with at least one uplink transmission repetition of the set of multiple uplink transmission repetitions.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for which may enable UCI messages which overlap with one or more linked PUSCH repetitions to be multiplexed on one or more of the linked PUSCH repetitions. As such, techniques provided herein may reduce control signaling overhead within the wireless communications system 100, which may lead to more efficient utilization of resources, reduced power consumption, and longer battery life. and may lead to more efficient utilization of resources.

Figure 12:
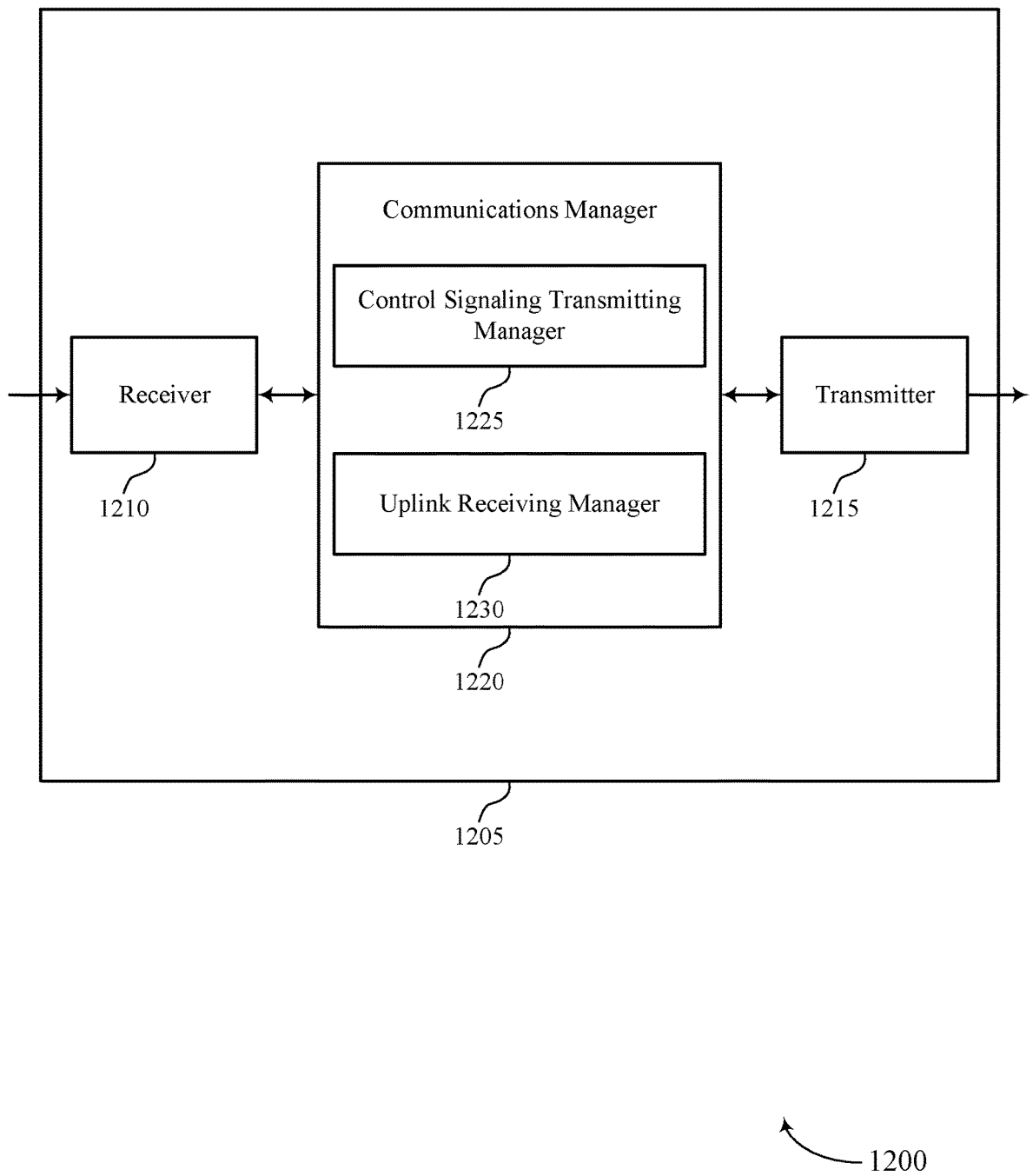

FIG. 12 shows a block diagram 1200 of a device 1205 that supports techniques for multiplexing UCI on uplink channel repetitions in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for multiplexing UCI on uplink channel repetitions). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for multiplexing UCI on uplink channel repetitions). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for multiplexing UCI on uplink channel repetitions as described herein. For example, the communications manager 1220 may include a control signaling transmitting manager 1225 an uplink receiving manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The control signaling transmitting manager 1225 may be configured as or otherwise support a means for transmitting, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The control signaling transmitting manager 1225 may be configured as or otherwise support a means for transmitting, to the UE, additional control signaling scheduling transmission of an uplink control channel message that overlaps in time with at least one uplink transmission repetition of the set of multiple uplink transmission repetitions. The uplink receiving manager 1230 may be configured as or otherwise support a means for receiving the set of multiple uplink transmission repetitions including a set of multiple repetitions of the A-CSI and the uplink control channel message multiplexed with at least one uplink transmission repetition of the set of multiple uplink transmission repetitions.

Figure 13:
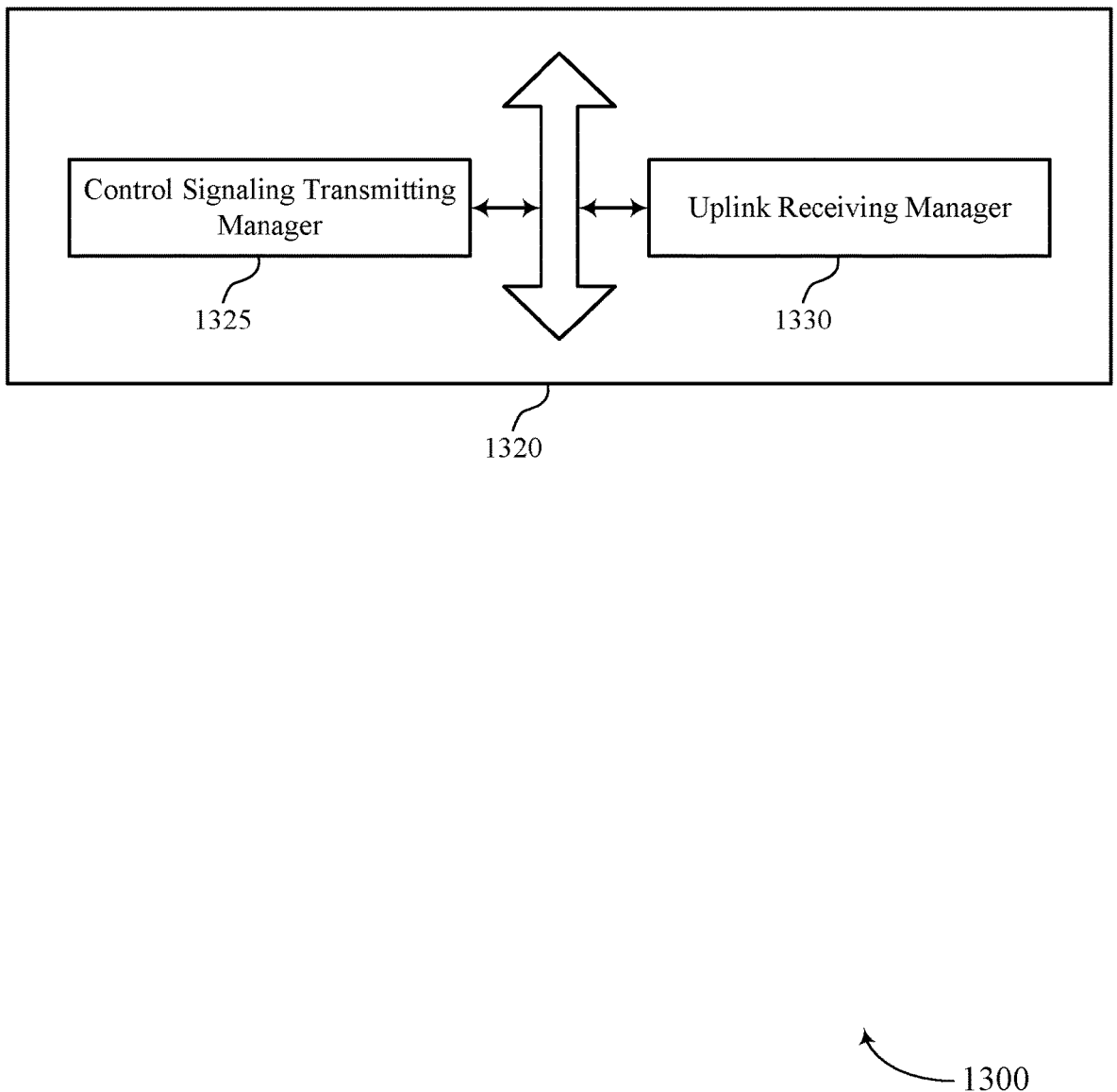
FIG. 13 shows a block diagram of a communications manager that supports techniques for multiplexing UCI on uplink channel repetitions in accordance with aspects of the present disclosure.

FIG. 13 shows a block diagram 1300 of a communications manager 1320 that supports techniques for multiplexing UCI on uplink channel repetitions in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for multiplexing UCI on uplink channel repetitions as described herein. For example, the communications manager 1320 may include a control signaling transmitting manager 1325 an uplink receiving manager 1330, or any combination thereof. Each of these components may communicate, directly or indirectly, with one another (e.g., via one or more buses).

The communications manager 1320 may support wireless communication at a base station in accordance with examples as disclosed herein. The control signaling transmitting manager 1325 may be configured as or otherwise support a means for transmitting, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. In some examples, the control signaling transmitting manager 1325 may be configured as or otherwise support a means for transmitting, to the UE, additional control signaling scheduling transmission of an uplink control channel message that overlaps in time with at least one uplink transmission repetition of the set of multiple uplink transmission repetitions. The uplink receiving manager 1330 may be configured as or otherwise support a means for receiving the set of multiple uplink transmission repetitions including a set of multiple repetitions of the A-CSI and the uplink control channel message multiplexed with at least one uplink transmission repetition of the set of multiple uplink transmission repetitions.

In some examples, to support receiving the set of multiple uplink transmission repetitions, the uplink receiving manager 1330 may be configured as or otherwise support a means for receiving a first repetition of the uplink control channel message multiplexed with a first uplink channel repetition of the first set of repetitions which follows in time the scheduled uplink control channel message. In some examples, to support receiving the set of multiple uplink transmission repetitions, the uplink receiving manager 1330 may be configured as or otherwise support a means for receiving a second repetition of the uplink control channel message multiplexed with a first uplink channel repetition of the second set of repetitions which follows in time the scheduled uplink control channel message.

In some examples, the first repetition and the second repetition are multiplexed based on a first length of the first uplink channel repetition of the first set of repetitions being equal to a second length of the first uplink channel repetition of the second set of repetitions. In some examples, the first repetition and the second repetition are multiplexed based on an absence of additional uplink control channel messages multiplexed with the first uplink channel repetition of the first set of repetitions and the first uplink channel repetition of the second set of repetitions. In some examples, the first repetition and the second repetition are multiplexed based on an additional uplink control channel message being multiplexed with both the first uplink channel repetition of the first set of repetitions and the first uplink channel repetition of the second set of repetitions.

In some examples, the uplink receiving manager 1330 may be configured as or otherwise support a means for receiving a first repetition of the A-CSI via the first uplink channel repetition of the first set of repetitions which follows in time the scheduled uplink control channel message. In some examples, the uplink receiving manager 1330 may be configured as or otherwise support a means for receiving a second repetition of the A-CSI via the first uplink channel repetition of the second set of repetitions which follows in time the scheduled uplink control channel message.

In some examples, to support receiving the set of multiple uplink transmission repetitions, the uplink receiving manager 1330 may be configured as or otherwise support a means for receiving a first repetition of the uplink control channel message multiplexed with a first uplink channel repetition of the first set of repetitions which follows in time the scheduled uplink control channel message and which does not include a repetition of the A-CSI or other multiplexed uplink control channel messages.

In some examples, to support receiving the set of multiple uplink transmission repetitions, the uplink receiving manager 1330 may be configured as or otherwise support a means for receiving a second repetition of the uplink control channel message multiplexed with a first uplink channel repetition of the second set of repetitions which follows in time the scheduled uplink control channel message and which does not include a repetition of the A-CSI or other multiplexed uplink control channel messages.

In some examples, the uplink control channel message is multiplexed with the at least one uplink transmission repetition of the set of multiple uplink transmission repetitions in accordance with a UCI multiplexing configuration supported by the UE based on a quantity of uplink transmission repetitions of the set of multiple uplink transmission repetitions which overlap in time with the uplink control channel repetition.

In some examples, to support receiving the set of multiple uplink channel repetitions including the set of multiple repetitions of the A-CSI, the uplink receiving manager 1330 may be configured as or otherwise support a means for receiving a first repetition of the A-CSI via a first uplink channel repetition of the first set of repetitions and a second repetition of the A-CSI via a first uplink channel repetition of the second set of repetitions.

In some examples, the uplink control channel message includes a UCI message. In some examples, the uplink control channel message includes HARQ information, P-CSI, SP-CSI, or any combination thereof. In some examples, the set of multiple uplink transmission repetitions and the uplink control channel message are scheduled on the same uplink component carrier. In some examples, the set of multiple uplink transmission repetitions are scheduled on a first uplink component carrier. In some examples, the uplink control channel message is scheduled on a second uplink component carrier which is different from the first uplink component carrier.

Figure 14:
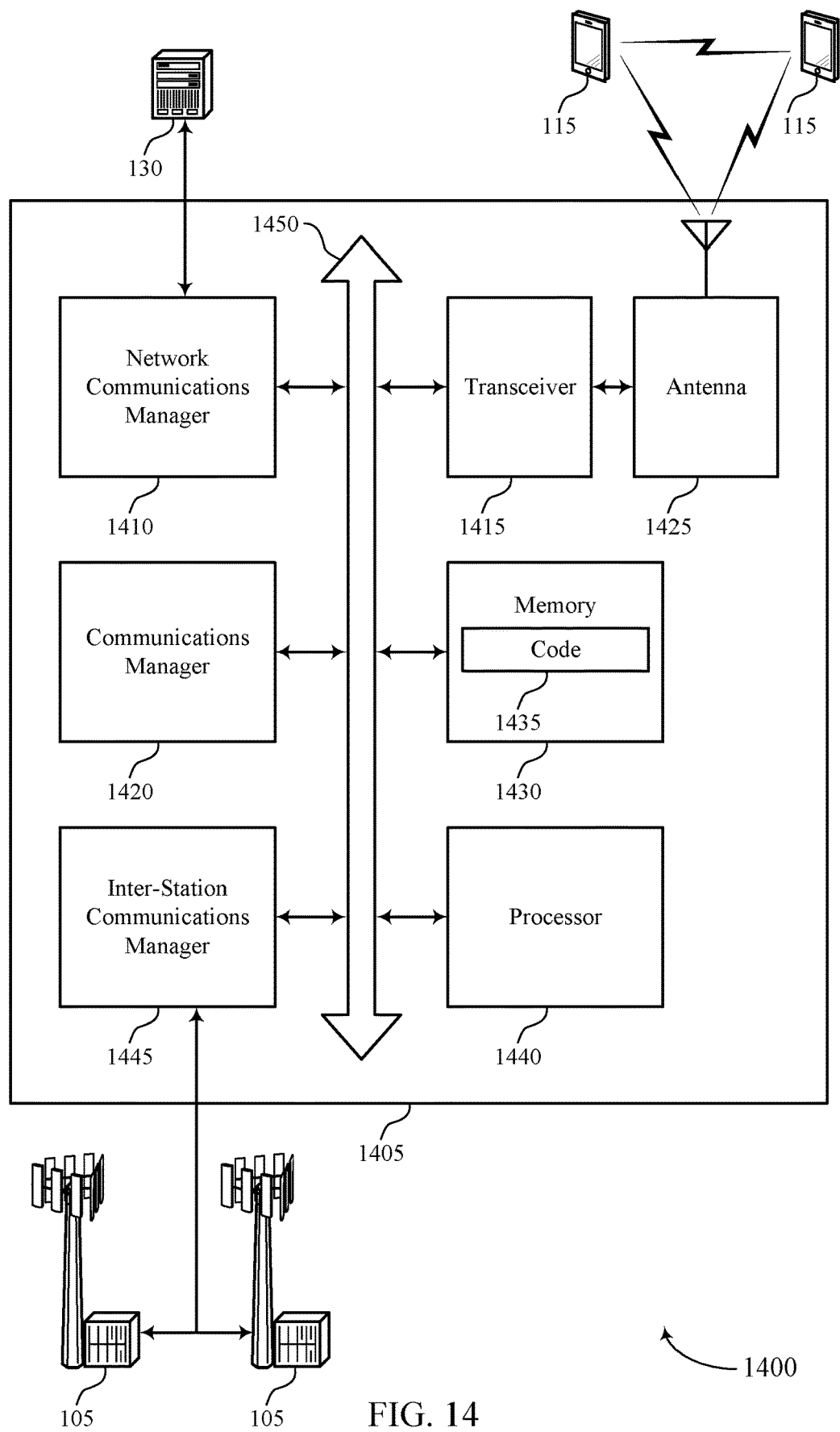
FIG. 14 shows a diagram of a system including a device that supports techniques for multiplexing UCI on uplink channel repetitions in accordance with aspects of the present disclosure.

FIG. 14 shows a diagram of a system 1400 including a device 1405 that supports techniques for multiplexing UCI on uplink channel repetitions in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for multiplexing UCI on uplink channel repetitions). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The communications manager 1420 may be configured as or otherwise support a means for transmitting, to the UE, additional control signaling scheduling transmission of an uplink control channel message that overlaps in time with at least one uplink transmission repetition of the set of multiple uplink transmission repetitions. The communications manager 1420 may be configured as or otherwise support a means for receiving the set of multiple uplink transmission repetitions including a set of multiple repetitions of the A-CSI and the uplink control channel message multiplexed with at least one uplink transmission repetition of the set of multiple uplink transmission repetitions.

By including or configuring the communications manager 1420 in accordance with examples as described herein, the device 1405 may support techniques for which may enable UCI messages which overlap with one or more linked PUSCH repetitions to be multiplexed on one or more of the linked PUSCH repetitions. As such, techniques provided herein may reduce control signaling overhead within the wireless communications system 100, which may lead to more efficient utilization of resources, reduced power consumption, and longer battery life. and may lead to more efficient utilization of resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for multiplexing UCI on uplink channel repetitions as described herein, or the processor 1440 and the memory 1430 may be otherwise configured to perform or support such operations.

Figure 15:
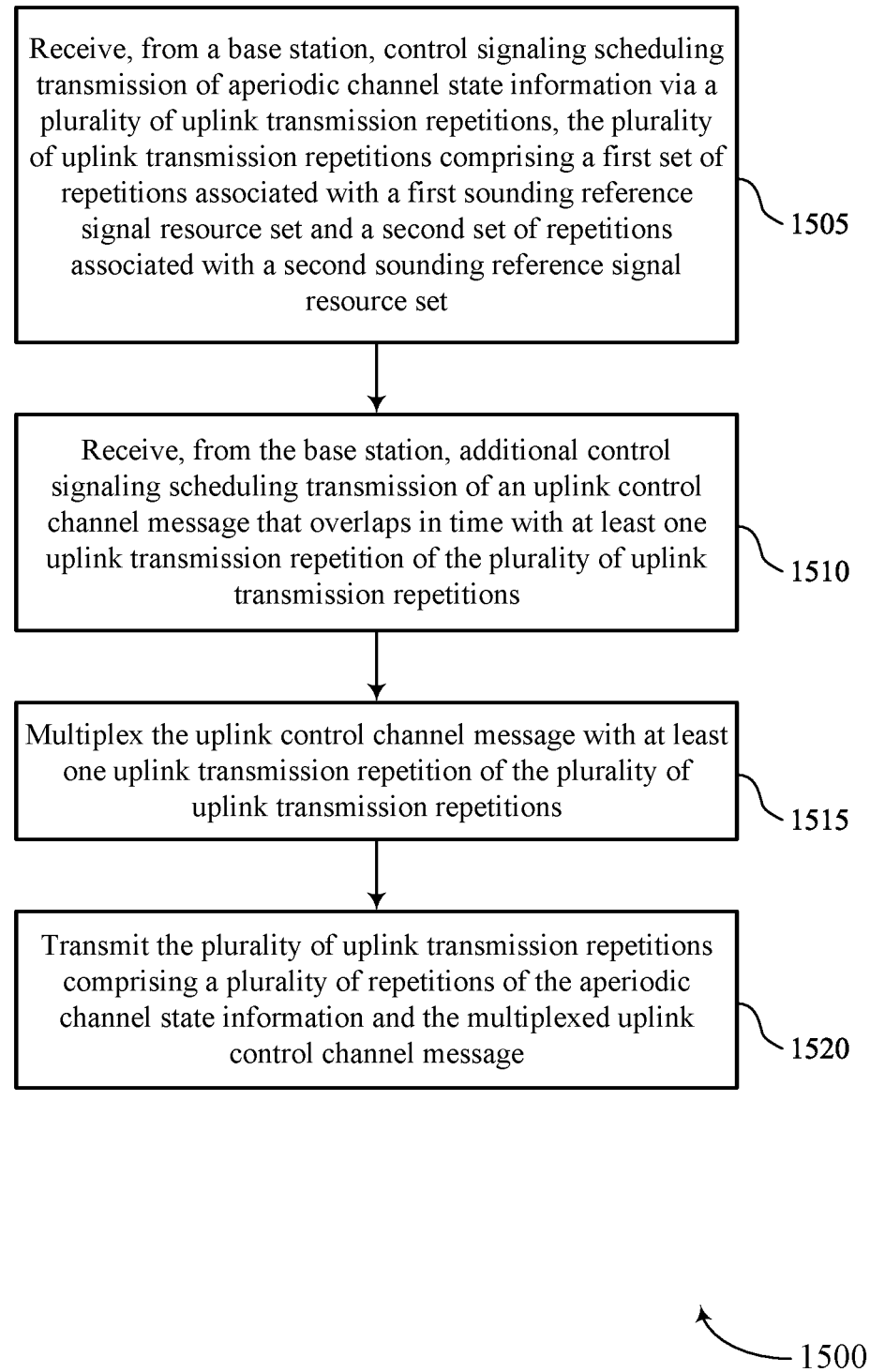
FIGS. 15 through 18 show flowcharts illustrating methods that support techniques for multiplexing UCI on uplink channel repetitions in accordance with aspects of the present disclosure.

FIG. 15 shows a flowchart illustrating a method 1500 that supports techniques for multiplexing UCI on uplink channel repetitions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The operations of 1505 may be performed in accordance with examples as disclosed herein. In some examples, aspects of the operations of 1505 may be performed by a control signaling receiving manager 925 as described with reference to FIG. 9.

At 1510, the method may include receiving, from the base station, additional control signaling scheduling transmission of an uplink control channel message that overlaps in time with at least one uplink transmission repetition of the set of multiple uplink transmission repetitions. The operations of 1510 may be performed in accordance with examples as disclosed herein. In some examples, aspects of the operations of 1510 may be performed by a control signaling receiving manager 925 as described with reference to FIG. 9.

At 1515, the method may include multiplexing the uplink control channel message with at least one uplink transmission repetition of the set of multiple uplink transmission repetitions. The operations of 1515 may be performed in accordance with examples as disclosed herein. In some examples, aspects of the operations of 1515 may be performed by a UCI multiplexing manager 930 as described with reference to FIG. 9.

At 1520, the method may include transmitting the set of multiple uplink transmission repetitions including a set of multiple repetitions of the A-CSI and the multiplexed uplink control channel message. The operations of 1520 may be performed in accordance with examples as disclosed herein. In some examples, aspects of the operations of 1520 may be performed by an uplink transmitting manager 935 as described with reference to FIG. 9.

Figure 16:
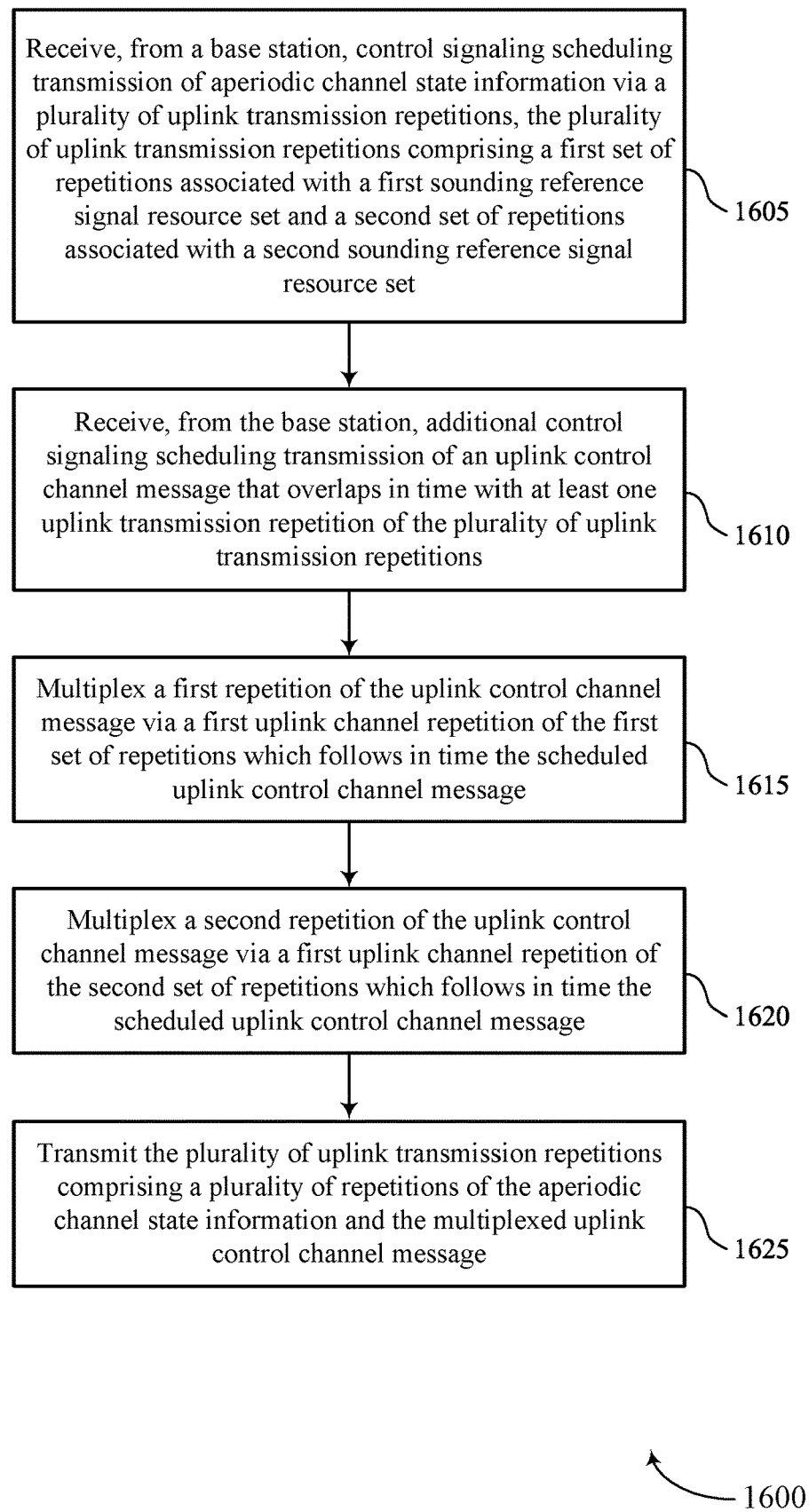

FIG. 16 shows a flowchart illustrating a method 1600 that supports techniques for multiplexing UCI on uplink channel repetitions in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The operations of 1605 may be performed in accordance with examples as disclosed herein. In some examples, aspects of the operations of 1605 may be performed by a control signaling receiving manager 925 as described with reference to FIG. 9.

At 1610, the method may include receiving, from the base station, additional control signaling scheduling transmission of an uplink control channel message that overlaps in time with at least one uplink transmission repetition of the set of multiple uplink transmission repetitions. The operations of 1610 may be performed in accordance with examples as disclosed herein. In some examples, aspects of the operations of 1610 may be performed by a control signaling receiving manager 925 as described with reference to FIG. 9.

At 1615, the method may include multiplexing a first repetition of the uplink control channel message via a first uplink channel repetition of the first set of repetitions which follows in time the scheduled uplink control channel message. The operations of 1615 may be performed in accordance with examples as disclosed herein. In some examples, aspects of the operations of 1615 may be performed by a UCI multiplexing manager 930 as described with reference to FIG. 9.

At 1620, the method may include multiplexing a second repetition of the uplink control channel message via a first uplink channel repetition of the second set of repetitions which follows in time the scheduled uplink control channel message. The operations of 1620 may be performed in accordance with examples as disclosed herein. In some examples, aspects of the operations of 1620 may be performed by a UCI multiplexing manager 930 as described with reference to FIG. 9.

At 1625, the method may include transmitting the set of multiple uplink transmission repetitions including a set of multiple repetitions of the A-CSI and the multiplexed uplink control channel message. The operations of 1625 may be performed in accordance with examples as disclosed herein. In some examples, aspects of the operations of 1625 may be performed by an uplink transmitting manager 935 as described with reference to FIG. 9.

Figure 17:
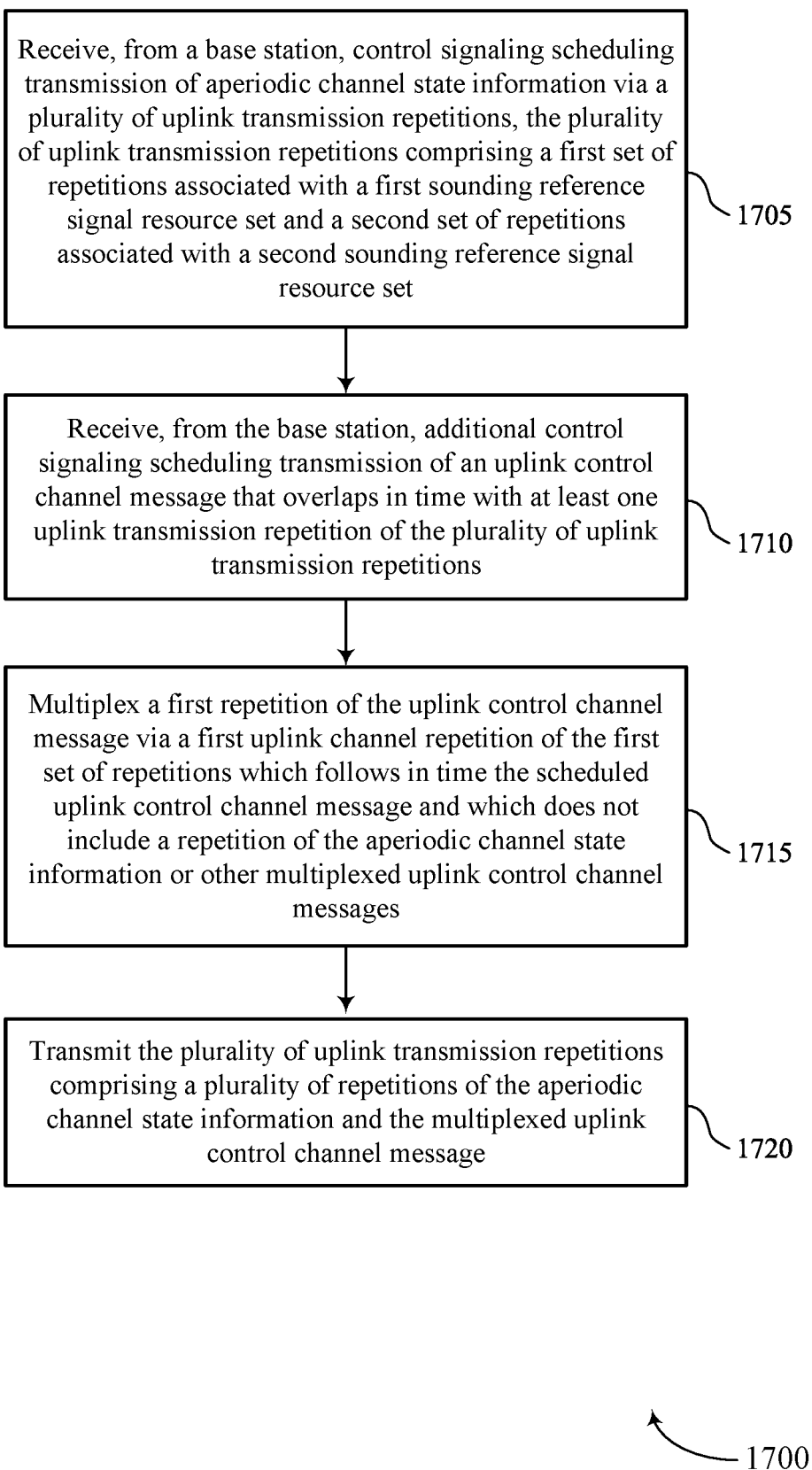

FIG. 17 shows a flowchart illustrating a method 1700 that supports techniques for multiplexing UCI on uplink channel repetitions in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The operations of 1705 may be performed in accordance with examples as disclosed herein. In some examples, aspects of the operations of 1705 may be performed by a control signaling receiving manager 925 as described with reference to FIG. 9.

At 1710, the method may include receiving, from the base station, additional control signaling scheduling transmission of an uplink control channel message that overlaps in time with at least one uplink transmission repetition of the set of multiple uplink transmission repetitions. The operations of 1710 may be performed in accordance with examples as disclosed herein. In some examples, aspects of the operations of 1710 may be performed by a control signaling receiving manager 925 as described with reference to FIG. 9.

At 1715, the method may include multiplexing a first repetition of the uplink control channel message via a first uplink channel repetition of the first set of repetitions which follows in time the scheduled uplink control channel message and which does not include a repetition of the A-CSI or other multiplexed uplink control channel messages. The operations of 1715 may be performed in accordance with examples as disclosed herein. In some examples, aspects of the operations of 1715 may be performed by a UCI multiplexing manager 930 as described with reference to FIG. 9.

At 1720, the method may include transmitting the set of multiple uplink transmission repetitions including a set of multiple repetitions of the A-CSI and the multiplexed uplink control channel message. The operations of 1720 may be performed in accordance with examples as disclosed herein. In some examples, aspects of the operations of 1720 may be performed by an uplink transmitting manager 935 as described with reference to FIG. 9.

Figure 18:
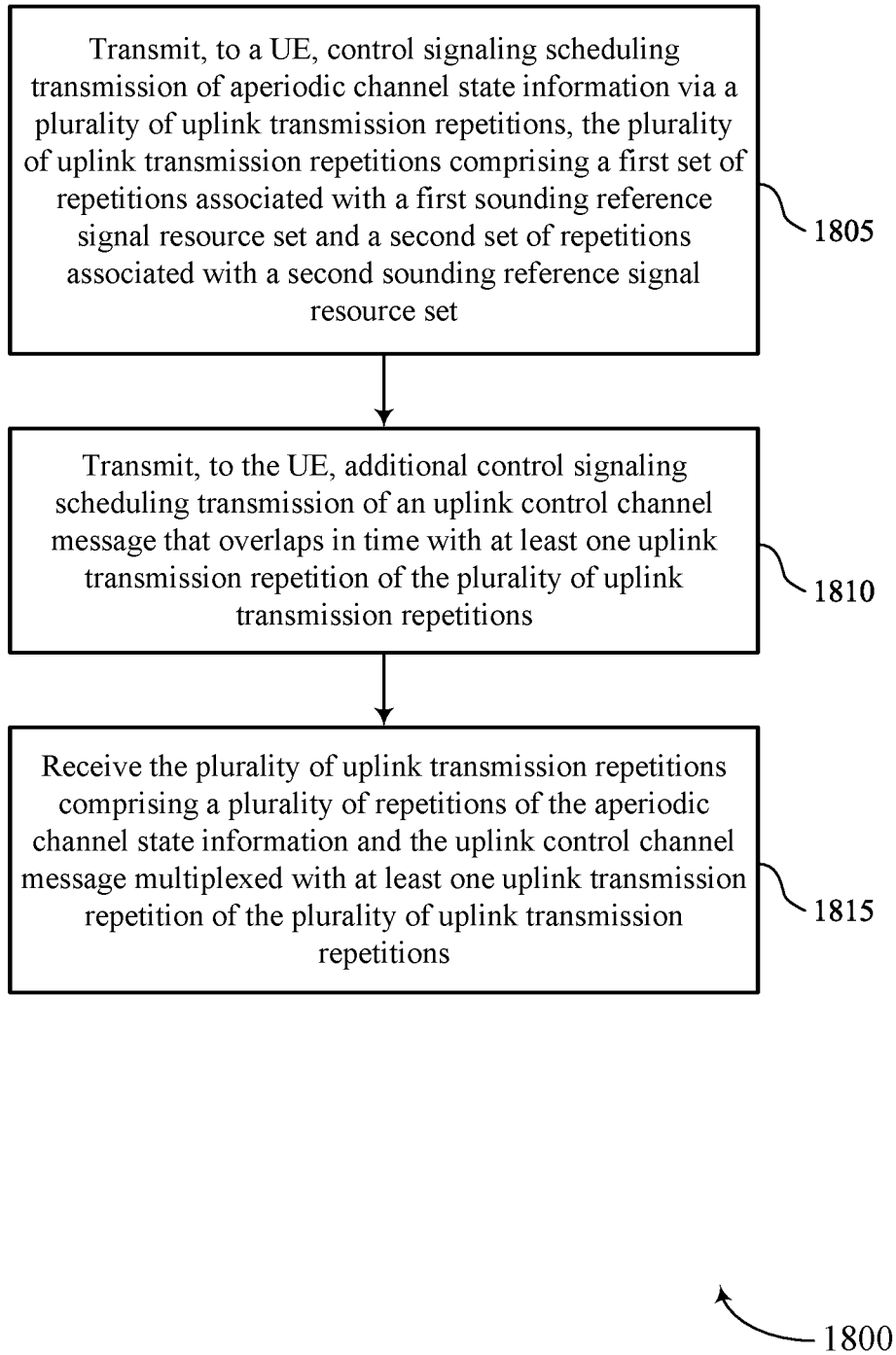

FIG. 18 shows a flowchart illustrating a method 1800 that supports techniques for multiplexing UCI on uplink channel repetitions in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling scheduling transmission of A-CSI via a set of multiple uplink transmission repetitions, the set of multiple uplink transmission repetitions including a first set of repetitions associated with a first SRS resource set and a second set of repetitions associated with a second SRS resource set. The operations of 1805 may be performed in accordance with examples as disclosed herein. In some examples, aspects of the operations of 1805 may be performed by a control signaling transmitting manager 1325 as described with reference to FIG. 13.

At 1810, the method may include transmitting, to the UE, additional control signaling scheduling transmission of an uplink control channel message that overlaps in time with at least one uplink transmission repetition of the set of multiple uplink transmission repetitions. The operations of 1810 may be performed in accordance with examples as disclosed herein. In some examples, aspects of the operations of 1810 may be performed by a control signaling transmitting manager 1325 as described with reference to FIG. 13.

At 1815, the method may include receiving the set of multiple uplink transmission repetitions including a set of multiple repetitions of the A-CSI and the uplink control channel message multiplexed with at least one uplink transmission repetition of the set of multiple uplink transmission repetitions. The operations of 1815 may be performed in accordance with examples as disclosed herein. In some examples, aspects of the operations of 1815 may be performed by an uplink receiving manager 1330 as described with reference to FIG. 13.

The following provides an overview of aspects of the present disclosure:

Aspect 1: A method for wireless communication at a UE, comprising: receiving, from a base station, control signaling scheduling transmission of A-CSI via a plurality of uplink transmission repetitions, the plurality of uplink transmission repetitions comprising a first set of repetitions associated with a first SRS resource set and a second set of repetitions associated with a second SRS resource set; receiving, from the base station, additional control signaling scheduling transmission of an uplink control channel message that overlaps in time with at least one uplink transmission repetition of the plurality of uplink transmission repetitions; multiplexing the uplink control channel message with at least one uplink transmission repetition of the plurality of uplink transmission repetitions; and transmitting the plurality of uplink transmission repetitions comprising a plurality of repetitions of the A-CSI and the multiplexed uplink control channel message.

Aspect 2: The method of aspect 1, wherein multiplexing the uplink control channel message comprises: multiplexing a first repetition of the uplink control channel message via a first uplink channel repetition of the first set of repetitions which follows in time the scheduled uplink control channel message; and multiplexing a second repetition of the uplink control channel message via a first uplink channel repetition of the second set of repetitions which follows in time the scheduled uplink control channel message.

Aspect 3: The method of aspect 2, further comprising: multiplexing the first repetition and the second repetition based at least in part on a first length of the first uplink channel repetition of the first set of repetitions being equal to a second length of the first uplink channel repetition of the second set of repetitions.

Aspect 4: The method of any of aspects 2 through 3, further comprising: multiplexing the first repetition and the second repetition based at least in part on an absence of additional uplink control channel messages multiplexed with the first uplink channel repetition of the first set of repetitions and the first uplink channel repetition of the second set of repetitions.

Aspect 5: The method of any of aspects 2 through 4, further comprising: multiplexing the first repetition and the second repetition based at least in part on an additional uplink control channel message being multiplexed with both the first uplink channel repetition of the first set of repetitions and the first uplink channel repetition of the second set of repetitions.

Aspect 6: The method of any of aspects 2 through 5, further comprising: transmitting a first repetition of the A-CSI via the first uplink channel repetition of the first set of repetitions which follows in time the scheduled uplink control channel message; and transmitting a second repetition of the A-CSI via the first uplink channel repetition of the second set of repetitions which follows in time the scheduled uplink control channel message.

Aspect 7: The method of any of aspects 1 through 6, wherein multiplexing the uplink control channel message comprises: multiplexing a first repetition of the uplink control channel message via a first uplink channel repetition of the first set of repetitions which follows in time the scheduled uplink control channel message and which does not include a repetition of the A-CSI or other multiplexed uplink control channel messages.

Aspect 8: The method of aspect 7, wherein multiplexing the uplink control channel message comprises: multiplexing a second repetition of the uplink control channel messages via a first uplink channel repetition of the second set of repetitions which follows in time the scheduled uplink control channel message and which does not include a repetition of the A-CSI or other multiplexed uplink control channel messages.

Aspect 9: The method of any of aspects 1 through 8, wherein multiplexing the uplink control channel message comprises: identifying a quantity of uplink transmission repetitions of the plurality of uplink transmission repetitions which overlap in time with the uplink control channel repetition, wherein multiplexing the uplink control channel message is based at least in part on the quantity of uplink transmission repetitions.

Aspect 10: The method of aspect 9, wherein multiplexing the uplink control channel message comprises: identifying a UCI multiplexing configuration from a plurality of UCI multiplexing configurations supported by the UE based at least in part on the quantity of uplink transmission repetitions of the plurality of uplink transmission repetitions which overlap in time with the uplink control channel repetition, the UCI multiplexing configuration governing multiplexing of the uplink control channel message with the at least one uplink transmission repetition of the plurality of uplink transmission repetitions.

Aspect 11: The method of any of aspects 1 through 10, wherein transmitting the plurality of uplink channel repetitions comprising the plurality of repetitions of the A-CSI comprises: transmitting a first repetition of the A-CSI via a first uplink channel repetition of the first set of repetitions and a second repetition of the A-CSI via a first uplink channel repetition of the second set of repetitions.

Aspect 12: The method of any of aspects 1 through 11, wherein the uplink control channel message comprises a UCI message.

Aspect 13: The method of any of aspects 1 through 12, wherein the uplink control channel message comprises HARQ information, P-CSI, SP-CSI, or any combination thereof.

Aspect 14: The method of any of aspects 1 through 13, wherein the plurality of uplink transmission repetitions and the uplink control channel message are scheduled on the same uplink component carrier.

Aspect 15: The method of any of aspects 1 through 14, wherein the plurality of uplink transmission repetitions are scheduled on a first uplink component carrier, and the uplink control channel message is scheduled on a second uplink component carrier which is different from the first uplink component carrier.

Aspect 16: A method for wireless communication at a base station, comprising: transmitting, to a UE, control signaling scheduling transmission of A-CSI via a plurality of uplink transmission repetitions, the plurality of uplink transmission repetitions comprising a first set of repetitions associated with a first SRS resource set and a second set of repetitions associated with a second SRS resource set; transmitting, to the UE, additional control signaling scheduling transmission of an uplink control channel message that overlaps in time with at least one uplink transmission repetition of the plurality of uplink transmission repetitions; and receiving the plurality of uplink transmission repetitions comprising a plurality of repetitions of the A-CSI and the uplink control channel message multiplexed with at least one uplink transmission repetition of the plurality of uplink transmission repetitions.

Aspect 17: The method of aspect 16, wherein receiving the plurality of uplink transmission repetitions further comprises: receiving a first repetition of the uplink control channel message multiplexed with a first uplink channel repetition of the first set of repetitions which follows in time the scheduled uplink control channel message; and receiving a second repetition of the uplink control channel message multiplexed with a first uplink channel repetition of the second set of repetitions which follows in time the scheduled uplink control channel message.

Aspect 18: The method of aspect 17, wherein the first repetition and the second repetition are multiplexed based at least in part on a first length of the first uplink channel repetition of the first set of repetitions being equal to a second length of the first uplink channel repetition of the second set of repetitions.

Aspect 19: The method of any of aspects 17 through 18, wherein the first repetition and the second repetition are multiplexed based at least in part on an absence of additional uplink control channel messages multiplexed with the first uplink channel repetition of the first set of repetitions and the first uplink channel repetition of the second set of repetitions.

Aspect 20: The method of any of aspects 17 through 19, wherein the first repetition and the second repetition are multiplexed based at least in part on an additional uplink control channel message being multiplexed with both the first uplink channel repetition of the first set of repetitions and the first uplink channel repetition of the second set of repetitions.

Aspect 21: The method of any of aspects 17 through 20, further comprising: receiving a first repetition of the A-CSI via the first uplink channel repetition of the first set of repetitions which follows in time the scheduled uplink control channel message; and receiving a second repetition of the A-CSI via the first uplink channel repetition of the second set of repetitions which follows in time the scheduled uplink control channel message.

Aspect 22: The method of any of aspects 16 through 21, wherein receiving the plurality of uplink transmission repetitions further comprises: receiving a first repetition of the uplink control channel message multiplexed with a first uplink channel repetition of the first set of repetitions which follows in time the scheduled uplink control channel message and which does not include a repetition of the A-CSI or other multiplexed uplink control channel messages.

Aspect 23: The method of aspect 22, wherein receiving the plurality of uplink transmission repetitions further comprises: receiving a second repetition of the uplink control channel message multiplexed with a first uplink channel repetition of the second set of repetitions which follows in time the scheduled uplink control channel message and which does not include a repetition of the A-CSI or other multiplexed uplink control channel messages.

Aspect 24: The method of any of aspects 16 through 23, wherein the uplink control channel message is multiplexed with the at least one uplink transmission repetition of the plurality of uplink transmission repetitions in accordance with a UCI multiplexing configuration supported by the UE based at least in part on a quantity of uplink transmission repetitions of the plurality of uplink transmission repetitions which overlap in time with the uplink control channel repetition.

Aspect 25: The method of any of aspects 16 through 24, wherein receiving the plurality of uplink channel repetitions comprising the plurality of repetitions of the A-CSI comprises: receiving a first repetition of the A-CSI via a first uplink channel repetition of the first set of repetitions and a second repetition of the A-CSI via a first uplink channel repetition of the second set of repetitions.

Aspect 26: The method of any of aspects 16 through 25, wherein the uplink control channel message comprises a UCI message.

Aspect 27: The method of any of aspects 16 through 26, wherein the uplink control channel message comprises HARQ information, P-CSI, SP-CSI, or any combination thereof.

Aspect 28: The method of any of aspects 16 through 27, wherein the plurality of uplink transmission repetitions and the uplink control channel message are scheduled on the same uplink component carrier.

Aspect 29: The method of any of aspects 16 through 28, wherein the plurality of uplink transmission repetitions are scheduled on a first uplink component carrier, and the uplink control channel message is scheduled on a second uplink component carrier which is different from the first uplink component carrier.

Aspect 30: An apparatus for wireless communication at a UE, comprising a processor; memory coupled with the processor; and instructions stored in the memory and executable by the processor to cause the apparatus to perform a method of any of aspects 1 through 15.

Aspect 31: An apparatus for wireless communication at a UE, comprising at least one means for performing a method of any of aspects 1 through 15.

Aspect 32: A non-transitory computer-readable medium storing code for wireless communication at a UE, the code comprising instructions executable by a processor to perform a method of any of aspects 1 through 15.

Aspect 33: An apparatus for wireless communication at a base station, comprising a processor; memory coupled with the processor; and instructions stored in the memory and executable by the processor to cause the apparatus to perform a method of any of aspects 16 through 29.

Aspect 34: An apparatus for wireless communication at a base station, comprising at least one means for performing a method of any of aspects 16 through 29.

Aspect 35: A non-transitory computer-readable medium storing code for wireless communication at a base station, the code comprising instructions executable by a processor to perform a method of any of aspects 16 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a base station, control signaling scheduling transmission of aperiodic channel state information via a plurality of uplink transmission repetitions, the plurality of uplink transmission repetitions comprising a first set of repetitions associated with a first sounding reference signal resource set and a second set of repetitions associated with a second sounding reference signal resource set;
receiving, from the base station, additional control signaling scheduling transmission of an uplink control channel message that overlaps in time with at least one uplink transmission repetition of the plurality of uplink transmission repetitions;

multiplexing a first repetition of the uplink control channel message via a first uplink transmission repetition of the first set of repetitions which follows in time the scheduled uplink control channel message;

multiplexing a second repetition of the uplink control channel message via a first uplink channel repetition of the second set of repetitions which follows in time the scheduled uplink control channel message; and transmitting the plurality of uplink transmission repetitions comprising a plurality of repetitions of the aperiodic channel state information and the multiplexed uplink control channel message, wherein transmitting the plurality of uplink transmission repetitions comprises:

transmitting a first repetition of the aperiodic channel state information via the first uplink channel repetition of the first set of repetitions; and transmitting a second repetition of the aperiodic channel state information via the first uplink channel repetition of the second set of repetitions.

2. The method of claim 1, further comprising:
multiplexing the first repetition of the uplink control channel message and the second repetition of the uplink control channel message based at least in part on a first length of the first uplink channel repetition of the first set of repetitions being equal to a second length of the first uplink channel repetition of the second set of repetitions.

3. The method of claim 1, further comprising:
multiplexing the first repetition of the uplink control channel message and the second repetition of the uplink control channel message based at least in part on an absence of additional uplink control channel messages multiplexed with the first uplink channel repetition of the first set of repetitions and the first uplink channel repetition of the second set of repetitions.

4. The method of claim 1, further comprising:
multiplexing the first repetition of the uplink control channel message and the second repetition of the uplink control channel message based at least in part on an additional uplink control channel message being multiplexed with both the first uplink channel repetition of the first set of repetitions and the first uplink channel repetition of the second set of repetitions.

5. The method of claim 1, wherein multiplexing the uplink control channel message comprises:
identifying a quantity of uplink transmission repetitions of the plurality of uplink transmission repetitions which overlap in time with the uplink control channel message, wherein multiplexing the uplink control channel message is based at least in part on the quantity of uplink transmission repetitions.

6. The method of claim 5, comprising:
identifying an uplink control information multiplexing configuration from a plurality of uplink control information multiplexing configurations supported by the UE based at least in part on the quantity of uplink transmission repetitions of the plurality of uplink transmission repetitions which overlap in time with the uplink control channel message, the uplink control information multiplexing configuration governing multiplexing of the uplink control channel message with the at least one uplink transmission repetition of the plurality of uplink transmission repetitions, wherein multiplexing the first repetition and the second repetition of the uplink control channel message is based at least in part on the uplink control information multiplexing configuration.

7. The method of claim 1, wherein the uplink control channel message comprises an uplink control information message.

8. The method of claim 1, wherein the uplink control channel message comprises hybrid automatic repeat request information, periodic channel state information, semi-persistent channel state information, or any combination thereof.

9. The method of claim 1, wherein the plurality of uplink transmission repetitions and the uplink control channel message are scheduled on the same uplink component carrier.

10. The method of claim 1, wherein the plurality of uplink transmission repetitions are scheduled on a first uplink component carrier, and wherein the uplink control channel message is scheduled on a second uplink component carrier which is different from the first uplink component carrier.

11. A method for wireless communication at a base station, comprising:
transmitting, to a user equipment (UE), control signaling scheduling transmission of aperiodic channel state information via a plurality of uplink transmission repetitions, the plurality of uplink transmission repetitions comprising a first set of repetitions associated with a first sounding reference signal resource set and a second set of repetitions associated with a second sounding reference signal resource set;

transmitting, to the UE, additional control signaling scheduling transmission of an uplink control channel message that overlaps in time with at least one uplink transmission repetition of the plurality of uplink transmission repetitions; and receiving the plurality of uplink transmission repetitions comprising a plurality of repetitions of the aperiodic channel state information and the uplink control channel message multiplexed with at least one uplink transmission repetition of the plurality of uplink transmission repetitions, wherein receiving the plurality of uplink transmission repetitions comprises:

receiving a first repetition of the uplink control channel message and a first repetition of the aperiodic channel state information multiplexed with a first uplink channel repetition of the first set of repetitions which follows in time the scheduled uplink control channel message; and receiving a second repetition of the uplink control channel message and a second repetition of the aperiodic channel state information with a first uplink channel repetition of the second set of repetitions which follows in time the scheduled uplink control channel message.

12. The method of claim 11, wherein the first repetition and the second repetition are multiplexed based at least in part on a first length of the first uplink channel repetition of the first set of repetitions being equal to a second length of the first uplink channel repetition of the second set of repetitions.

13. The method of claim 11, wherein the first repetition of the uplink control channel message and the second repetition of the uplink control channel message are multiplexed based at least in part on an absence of additional uplink control channel messages multiplexed with the first uplink channel repetition of the first set of repetitions and the first uplink channel repetition of the second set of repetitions.

14. The method of claim 11, wherein the first repetition of the uplink control channel message and the second repetition of the uplink control channel message are multiplexed based at least in part on an additional uplink control channel message being multiplexed with both the first uplink channel repetition of the first set of repetitions and the first uplink channel repetition of the second set of repetitions.

15. The method of claim 11, wherein the first repetition and the second repetition of the uplink control channel message are multiplexed with the first uplink channel repetition of the first set of repetitions and the first uplink channel repetition of the second set of repetitions, respectively, in accordance with an uplink control information multiplexing configuration supported by the UE based at least in part on a quantity of uplink transmission repetitions of the plurality of uplink transmission repetitions which overlap in time with the uplink control channel message.

16. The method of claim 11, wherein the uplink control channel message comprises an uplink control information message.

17. The method of claim 11, wherein the plurality of uplink transmission repetitions and the uplink control channel message are scheduled on the same uplink component carrier.

18. The method of claim 11, wherein the plurality of uplink transmission repetitions are scheduled on a first uplink component carrier, and wherein the uplink control channel message is scheduled on a second uplink component carrier which is different from the first uplink component carrier.

19. An apparatus for wireless communication at a user equipment (UE), comprising:
    at least one processor;
    memory coupled with the at least one processor, the memory storing instructions executable by the at least one processor to cause the UE to:
        receive, from a base station, control signaling scheduling transmission of aperiodic channel state information via a plurality of uplink transmission repetitions, the plurality of uplink transmission repetitions comprising a first set of repetitions associated with a first sounding reference signal resource set and a second set of repetitions associated with a second sounding reference signal resource set;
        receive, from the base station, additional signaling scheduling transmission of an uplink control channel message that overlaps in time with at least one uplink transmission repetition of the plurality of uplink transmission repetitions;
        multiplex a first repetition of the uplink control channel message via a first uplink transmission repetition of the first set of repetitions which follows in time the scheduled uplink control channel message;
        multiplex a second repetition of the uplink control channel message via a first uplink channel repetition of the second set of repetitions which follows in time the scheduled uplink control channel message; and
        transmit the plurality of uplink transmission repetitions comprising a plurality of repetitions of the aperiodic channel state information and the multiplexed uplink control channel message, wherein transmitting the plurality of uplink transmission repetitions comprises:
            transmit a first repetition of the aperiodic channel state information via the first uplink channel repetition of the first set of repetitions; and
            transmit a second repetition of the aperiodic channel state information via the first uplink channel repetition of the second set of repetitions.

20. An apparatus for wireless communication at a network entity, comprising:
    at least one processor;
    memory coupled with the at least one processor, the memory storing instructions executable by the at least one processor to cause the network entity to:
        transmit, to a user equipment (UE), control signaling scheduling transmission of aperiodic channel state information via a plurality of uplink transmission repetitions, the plurality of uplink transmission repetitions comprising a first set of repetitions associated with a first sounding reference signal resource set and a second set of repetitions associated with a second sounding reference signal resource set;
        transmit, to the UE, additional control signaling scheduling transmission of an uplink control channel message that overlaps in time with at least one uplink transmission repetition of the plurality of uplink transmission repetitions; and
        receive the plurality of uplink transmission repetitions comprising a plurality of repetitions of the aperiodic channel state information and the uplink control channel message multiplexed with at least one uplink transmission repetition of the plurality of uplink transmission repetitions, wherein receiving the plurality of uplink transmission repetitions comprises:
            receiving a first repetition of the uplink control channel message and a first repetition of the aperiodic channel state information multiplexed with a first uplink channel repetition of the first set of repetitions which follows in time the scheduled uplink control channel message; and
            receiving a second repetition of the uplink control channel message and a second repetition of the aperiodic channel state information with a first uplink channel repetition of the second set of repetitions which follows in time the scheduled uplink control channel message.

* * * * *